(12) United States Patent
Takeda et al.

(10) Patent No.: US 12,348,452 B2
(45) Date of Patent: Jul. 1, 2025

(54) PATTERNS FOR CONTROL CHANNEL PUNCTURING AND SHARED CHANNEL RATE-MATCHING

(71) Applicant: QUALCOMM Incorporated, San Diego, CA (US)

(72) Inventors: Kazuki Takeda, Tokyo (JP); Mostafa Khoshnevisan, San Diego, CA (US); Peter Gaal, San Diego, CA (US); Alberto Rico Alvarino, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/712,806

(22) Filed: Apr. 4, 2022

(65) Prior Publication Data

US 2023/0318786 A1 Oct. 5, 2023

(51) Int. Cl.
*H04L 5/00* (2006.01)

(52) U.S. Cl.
CPC .......... *H04L 5/0053* (2013.01); *H04L 5/0078* (2013.01)

(58) Field of Classification Search
None
See application file for complete search history.

(56) References Cited

U.S. PATENT DOCUMENTS

| 2019/0140802 | A1* | 5/2019 | Seo ..................... H04W 72/23 |
| 2020/0014487 | A1* | 1/2020 | Akkarakaran .... H04W 72/0446 |
| 2021/0091915 | A1* | 3/2021 | Khoshnevisan ...... H04L 5/0094 |
| 2022/0124711 | A1* | 4/2022 | Zhou ..................... H04W 16/14 |
| 2022/0150011 | A1* | 5/2022 | Kim ........................ H04L 1/00 |
| 2022/0256574 | A1* | 8/2022 | Shi ........................ H04L 1/1861 |
| 2022/0303080 | A1* | 9/2022 | Sun ....................... H04L 5/0053 |
| 2022/0312452 | A1* | 9/2022 | Frenne .................... H04L 5/005 |
| 2022/0345195 | A1* | 10/2022 | Jang ..................... H04L 5/0094 |

(Continued)

FOREIGN PATENT DOCUMENTS

| WO | WO-2020162711 A1 | 8/2020 |
| WO | WO-2021033115 A1 | 2/2021 |

OTHER PUBLICATIONS

International Search Report and Written Opinion—PCT/US2023/065058—ISA/EPO—Jun. 23, 2023.

*Primary Examiner* — Clemence S Han
(74) *Attorney, Agent, or Firm* — Guang Y. Zhang; Holland & Hart LLP

(57) ABSTRACT

Methods, systems, and devices for wireless communications are described. A user equipment (UE) may receive an indication of a control resource set (CORESET) associated with a first radio access technology (RAT). The UE may receive an indication of a pattern for puncturing a control signal associated with the first RAT around resources allocated for reference signals associated with a second RAT. The UE may communicate the control signal according to the pattern. In some examples, the CORESET may be associated with a transmission configuration indicator (TCI) state and the UE may receive a message scheduling a data signal based on the CORESET. The data signal may be associated with the first RAT. The UE may receive an indication of a pattern for rate-matching the data signal around the resources allocated for reference signals associated with the second RAT. The UE may communicate the data signal according to the pattern.

28 Claims, 21 Drawing Sheets

(56) References Cited

U.S. PATENT DOCUMENTS

| | | | |
|---|---|---|---|
| 2022/0408464 A1* | 12/2022 | MolavianJazi | H04W 72/0453 |
| 2023/0049535 A1* | 2/2023 | Wang | H04L 5/0094 |
| 2023/0081776 A1* | 3/2023 | Kim | H04L 5/0051 |
| | | | 370/329 |
| 2023/0232313 A1* | 7/2023 | Ji | H04B 7/063 |
| | | | 370/329 |
| 2023/0300839 A1* | 9/2023 | Jung | H04L 5/0094 |

* cited by examiner

PATTERNS FOR CONTROL CHANNEL PUNCTURING AND SHARED CHANNEL RATE-MATCHING

FIELD OF TECHNOLOGY

The following relates to wireless communications, including patterns for control channel puncturing and shared channel rate-matching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support patterns for control channel puncturing and shared channel rate-matching. For example, the described techniques provide for configuring communication devices, such as user equipments (UEs), with patterns for control channel puncturing and shared channel rate-matching. In some examples, a UE may receive an indication of a control resource set (CORESET) associated with a first radio access technology (RAT). The UE may receive an indication of a pattern for puncturing one or multiple control signals associated with the first RAT around resources allocated in the CORESET for reference signals associated with a second RAT. In response, the UE may communicate the one or more control signals according to the pattern. In some examples, the CORESET may be associated with a transmission configuration indicator (TCI) state. The UE may receive a message scheduling a shared data signal based on the CORESET and the shared data signal may also be associated with the first RAT. The UE may receive an indication of a pattern for rate-matching the shared data signal around the resources allocated for the reference signals associated with the second RAT. In response, the UE may communicate the shared data signal according to the pattern. Such techniques may therefore increase the reliability of wireless communications between communication devices and the wireless communications network.

A method for wireless communications at a UE is described. The method may include receiving a first message based on a CORESET associated with a TCI state, the first message scheduling at least one shared data signal associated with a first RAT, receiving a second message indicating a pattern for rate-matching the at least one shared data signal around resources allocated for one or more reference signals associated with a second RAT, and communicating the at least one shared data signal in accordance with the pattern.

An apparatus for wireless communications at a UE is described. The apparatus may include a memory, and a processor coupled with the memory and configured to cause the apparatus to receive a first message based on a CORESET associated with a TCI state, the first message scheduling at least one shared data signal associated with a first RAT, receive a second message indicating a pattern for rate-matching the at least one shared data signal around resources allocated for one or more reference signals associated with a second RAT, and communicate the at least one shared data signal in accordance with the pattern.

Another apparatus for wireless communications at a UE is described. The apparatus may include means for receiving a first message based on a CORESET associated with a TCI state, the first message scheduling at least one shared data signal associated with a first RAT, means for receiving a second message indicating a pattern for rate-matching the at least one shared data signal around resources allocated for one or more reference signals associated with a second RAT, and means for communicating the at least one shared data signal in accordance with the pattern.

A non-transitory computer-readable medium storing code for wireless communications at a UE is described. The code may include instructions executable by a processor to receive a first message based on a CORESET associated with a TCI state, the first message scheduling at least one shared data signal associated with a first RAT, receive a second message indicating a pattern for rate-matching the at least one shared data signal around resources allocated for one or more reference signals associated with a second RAT, and communicate the at least one shared data signal in accordance with the pattern.

Some examples of the method, apparatuses, and non-transitory computer-readable medium described herein may further include operations, features, means, or instructions for receiving a third message indicating a first list including a first set of multiple patterns for rate-matching, where the pattern may be based on two patterns selected from the first set of multiple patterns of the first list, and where the two patterns may be overlapping in frequency.

Some examples of the method, apparatuses, and non-transitory computer-readable medium described herein may further include operations, features, means, or instructions for transmitting a report indicating at least one UE capability associated with the rate-matching, where receiving the third message may be based on the at least one UE capability.

Some examples of the method, apparatuses, and non-transitory computer-readable medium described herein may further include operations, features, means, or instructions for receiving a third message indicating a first list including a first set of multiple patterns for rate-matching and a second indication of a second list including a second set of multiple patterns for rate-matching, where the pattern may be based on a first pattern selected from the first list and a second pattern selected from the second list, and where the first pattern and the second pattern may be overlapping in frequency or non-overlapping in frequency.

In some examples of the method, apparatuses, and non-transitory computer-readable medium described herein, the first pattern and the second pattern may be associated with a pattern index and the first pattern may be selected from the first list and the second pattern may be selected from the second list based on the pattern index.

Some examples of the method, apparatuses, and non-transitory computer-readable medium described herein may further include operations, features, means, or instructions for receiving a third message indicating a first list including a first set of multiple patterns for rate-matching and a second indication of a second list including a second set of multiple patterns for rate-matching, where the pattern may be based on two patterns selected from the first list or the second list, and where the two patterns may be overlapping in frequency.

Some examples of the method, apparatuses, and non-transitory computer-readable medium described herein may further include operations, features, means, or instructions for identifying an indicator associated with the TCI state, where the two patterns may be selected from the first list based on the indicator including a first value and the two patterns may be selected from the second list based on the indicator including a second value different from the first value.

Some examples of the method, apparatuses, and non-transitory computer-readable medium described herein may further include operations, features, means, or instructions for receiving a fourth message indicating for the UE to select the two patterns from one of the first list or the second list and selecting the two patterns from one of the first list or the second list based on the fourth message.

Some examples of the method, apparatuses, and non-transitory computer-readable medium described herein may further include operations, features, means, or instructions for receiving a third message indicating the CORESET associated with the TCI state, where receiving the first message may be based on the third message.

A method for wireless communication at a UE is described. The method may include receiving a first message indicating a CORESET associated with a first RAT, receiving a second message based on the CORESET, the second message indicating a pattern for puncturing at least one control signal associated with the first RAT around resources allocated in the CORESET for reference signals associated with a second RAT, and communicating the at least one control signal in accordance with the pattern.

An apparatus for wireless communication at a UE is described. The apparatus may include a memory, and a processor coupled with the memory and configured to cause the apparatus to receive a first message indicating a CORESET associated with a first RAT, receive a second message based on the CORESET, the second message indicating a pattern for puncturing at least one control signal associated with the first RAT around resources allocated in the CORESET for reference signals associated with a second RAT, and communicate the at least one control signal in accordance with the pattern.

Another apparatus for wireless communication at a UE is described. The apparatus may include means for receiving a first message indicating a CORESET associated with a first RAT, means for receiving a second message based on the CORESET, the second message indicating a pattern for puncturing at least one control signal associated with the first RAT around resources allocated in the CORESET for reference signals associated with a second RAT, and means for communicating the at least one control signal in accordance with the pattern.

A non-transitory computer-readable medium storing code for wireless communication at a UE is described. The code may include instructions executable by a processor to receive a first message indicating a CORESET associated with a first RAT, receive a second message based on the CORESET, the second message indicating a pattern for puncturing at least one control signal associated with the first RAT around resources allocated in the CORESET for reference signals associated with a second RAT, and communicate the at least one control signal in accordance with the pattern.

Some examples of the method, apparatuses, and non-transitory computer-readable medium described herein may further include operations, features, means, or instructions for receiving a third message indicating at least one list, where each list of the at least one list includes a set of multiple patterns for puncturing, and where the pattern may be based on at least one pattern selected from the at least one list.

Some examples of the method, apparatuses, and non-transitory computer-readable medium described herein may further include operations, features, means, or instructions for receiving a fourth message indicating a pattern position, where the pattern may be based on one pattern of the at least one pattern, and where the one pattern may be selected from a list of the at least one list according to the pattern position.

In some examples of the method, apparatuses, and non-transitory computer-readable medium described herein, the pattern may be based on each pattern of the at least one pattern and each pattern of the at least one pattern may be selected from a list of the at least one list.

In some examples of the method, apparatuses, and non-transitory computer-readable medium described herein, the pattern may be based on each pattern of the at least one pattern.

Some examples of the method, apparatuses, and non-transitory computer-readable medium described herein may further include operations, features, means, or instructions for identifying an indicator associated with the CORESET, where the at least one pattern may be selected from a list of the at least one list, and where the list may be based on a value of the indicator.

In some examples of the method, apparatuses, and non-transitory computer-readable medium described herein, the second message includes a radio resource control (RRC) message and the second message indicates the pattern via an information element (IE).

Some examples of the method, apparatuses, and non-transitory computer-readable medium described herein may further include operations, features, means, or instructions for transmitting a report indicating at least one UE capability associated with puncturing control signals associated with the first RAT around the resources allocated in the CORESET for the reference signals associated with the second RAT, where receiving the second message may be based on the at least one UE capability.

In some examples of the method, apparatuses, and non-transitory computer-readable medium described herein, the at least one UE capability includes a capability of the UE to support puncturing according to a number of patterns associated with a serving cell, a capability of the UE to support punctuating according to a number of patterns that overlap in frequency and may be associated with a serving cell, a capability of the UE to support puncturing according to a number of patterns that non-overlapping in frequency and may be associated with a serving cell, a capability of the UE to support puncturing for a number of CORESETs associated with a bandwidth part or a serving cell, or any combination thereof.

A method for wireless communications at a network entity is described. The method may include transmitting a first message based on a CORESET associated with a TCI state, the first message scheduling at least one shared data signal associated with a first RAT, transmitting a second message indicating a pattern for rate-matching the at least one shared data signal around resources allocated for one or more reference signals associated with a second RAT, and communicating the at least one shared data signal in accordance with the pattern.

An apparatus for wireless communications at a network entity is described. The apparatus may include a memory, and a processor coupled with the memory and configured to cause the apparatus to transmit a first message based on a CORESET associated with a TCI state, the first message scheduling at least one shared data signal associated with a first RAT, transmit a second message indicating a pattern for rate-matching the at least one shared data signal around resources allocated for one or more reference signals associated with a second RAT, and communicate the at least one shared data signal in accordance with the pattern.

Another apparatus for wireless communications at a network entity is described. The apparatus may include means for transmitting a first message based on a CORESET associated with a TCI state, the first message scheduling at least one shared data signal associated with a first RAT, means for transmitting a second message indicating a pattern for rate-matching the at least one shared data signal around resources allocated for one or more reference signals associated with a second RAT, and means for communicating the at least one shared data signal in accordance with the pattern.

A non-transitory computer-readable medium storing code for wireless communications at a network entity is described. The code may include instructions executable by a processor to transmit a first message based on a CORESET associated with a TCI state, the first message scheduling at least one shared data signal associated with a first RAT, transmit a second message indicating a pattern for rate-matching the at least one shared data signal around resources allocated for one or more reference signals associated with a second RAT, and communicate the at least one shared data signal in accordance with the pattern.

Some examples of the method, apparatuses, and non-transitory computer-readable medium described herein may further include operations, features, means, or instructions for transmitting a third message indicating a first list including a first set of multiple patterns for rate-matching, where the pattern may be based on two patterns selected from the first set of multiple patterns of the first list, and where the two patterns may be overlapping in frequency or non-overlapping in frequency.

Some examples of the method, apparatuses, and non-transitory computer-readable medium described herein may further include operations, features, means, or instructions for receiving a report indicating at least one UE capability associated with the rate-matching, where transmitting the third message may be based on the at least one UE capability.

Some examples of the method, apparatuses, and non-transitory computer-readable medium described herein may further include operations, features, means, or instructions for transmitting a third message indicating a first list including a first set of multiple patterns for rate-matching and a second indication of a second list including a second set of multiple patterns for rate-matching, where the pattern may be based on a first pattern selected from the first list and a second pattern selected from the second list, and where the first pattern and the second pattern may be overlapping in frequency.

In some examples of the method, apparatuses, and non-transitory computer-readable medium described herein, the first pattern and the second pattern may be associated with a pattern index and the first pattern may be selected from the first list and the second pattern may be selected from the second list based on the pattern index.

Some examples of the method, apparatuses, and non-transitory computer-readable medium described herein may further include operations, features, means, or instructions for transmitting a third message indicating a first list including a first set of multiple patterns for rate-matching and a second indication of a second list including a second set of multiple patterns for rate-matching, where the pattern may be based on two patterns selected from one of the first list or the second list, and where the two patterns may be overlapping in frequency.

In some examples of the method, apparatuses, and non-transitory computer-readable medium described herein, the two patterns may be selected from the first list based on an indicator associated with the TCI state including a first value and the two patterns may be selected from the second list based on the indicator associated with the TCI state including a second value different from the first value.

Some examples of the method, apparatuses, and non-transitory computer-readable medium described herein may further include operations, features, means, or instructions for transmitting a fourth message indicating for a UE to select the two patterns from one of the first list or the second list.

Some examples of the method, apparatuses, and non-transitory computer-readable medium described herein may further include operations, features, means, or instructions for transmitting a third message indicating the CORESET associated with the TCI state, where receiving the first message may be based on the third message.

A method for wireless communication at a network entity is described. The method may include transmitting a first message indicating a CORESET associated with a first RAT, transmitting a second message based on the CORESET, the second message indicating a pattern for puncturing at least one control signal associated with the first RAT around resources allocated in the CORESET for reference signals associated with a second RAT, and communicating the at least one control signal in accordance with the pattern.

An apparatus for wireless communication at a network entity is described. The apparatus may include a memory, and a processor coupled with the memory and configured to cause the apparatus to transmit a first message indicating a CORESET associated with a first RAT, transmit a second message based on the CORESET, the second message indicating a pattern for puncturing at least one control signal associated with the first RAT around resources allocated in the CORESET for reference signals associated with a second RAT, and communicate the at least one control signal in accordance with the pattern.

Another apparatus for wireless communication at a network entity is described. The apparatus may include means for transmitting a first message indicating a CORESET associated with a first RAT, means for transmitting a second message based on the CORESET, the second message indicating a pattern for puncturing at least one control signal associated with the first RAT around resources allocated in the CORESET for reference signals associated with a second RAT, and means for communicating the at least one control signal in accordance with the pattern.

A non-transitory computer-readable medium storing code for wireless communication at a network entity is described. The code may include instructions executable by a processor to transmit a first message indicating a CORESET associated with a first RAT, transmit a second message based on the CORESET, the second message indicating a pattern for puncturing at least one control signal associated with the first RAT around resources allocated in the CORESET for reference signals associated with a second RAT, and communicate the at least one control signal in accordance with the pattern.

Some examples of the method, apparatuses, and non-transitory computer-readable medium described herein may further include operations, features, means, or instructions for transmitting a third message indicating at least one list, where each list of the at least one list includes a set of multiple patterns for puncturing, and where the pattern may be based on at least one pattern selected from the at least one list.

Some examples of the method, apparatuses, and non-transitory computer-readable medium described herein may further include operations, features, means, or instructions for transmitting a fourth message indicating a pattern position, where the pattern may be based on one pattern of the at least one pattern, and where the one pattern may be selected from a list of the at least one list according to the pattern position.

In some examples of the method, apparatuses, and non-transitory computer-readable medium described herein, the pattern may be based on each pattern of the at least one pattern and each pattern of the at least one pattern may be selected from a list of the at least one list.

In some examples of the method, apparatuses, and non-transitory computer-readable medium described herein, the pattern may be based on each pattern of the at least one pattern.

In some examples of the method, apparatuses, and non-transitory computer-readable medium described herein, the at least one pattern may be selected from a list of the at least one list and the list may be based on a value of an indicator associated with the CORESET.

In some examples of the method, apparatuses, and non-transitory computer-readable medium described herein, the second message includes an RRC message and the second message indicates the pattern via an IE.

Some examples of the method, apparatuses, and non-transitory computer-readable medium described herein may further include operations, features, means, or instructions for receiving a report indicating at least one UE capability associated with puncturing control signals associated with the first RAT around the resources allocated in the CORESET for the reference signals associated with the second RAT, where transmitting the second message may be based on the at least one UE capability.

In some examples of the method, apparatuses, and non-transitory computer-readable medium described herein, the at least one UE capability includes a capability of a UE to support puncturing according to a number of patterns associated with a serving cell, a capability of a UE to support punctuating according to a number of patterns that overlap in frequency and may be associated with a serving cell, a capability of a UE to support puncturing according to a number of patterns that non-overlapping in frequency and may be associated with a serving cell, a capability of a UE to support puncturing for a number of CORESETs associated with a bandwidth part or a serving cell, or any combination thereof.

DETAILED DESCRIPTION

Figure 1:
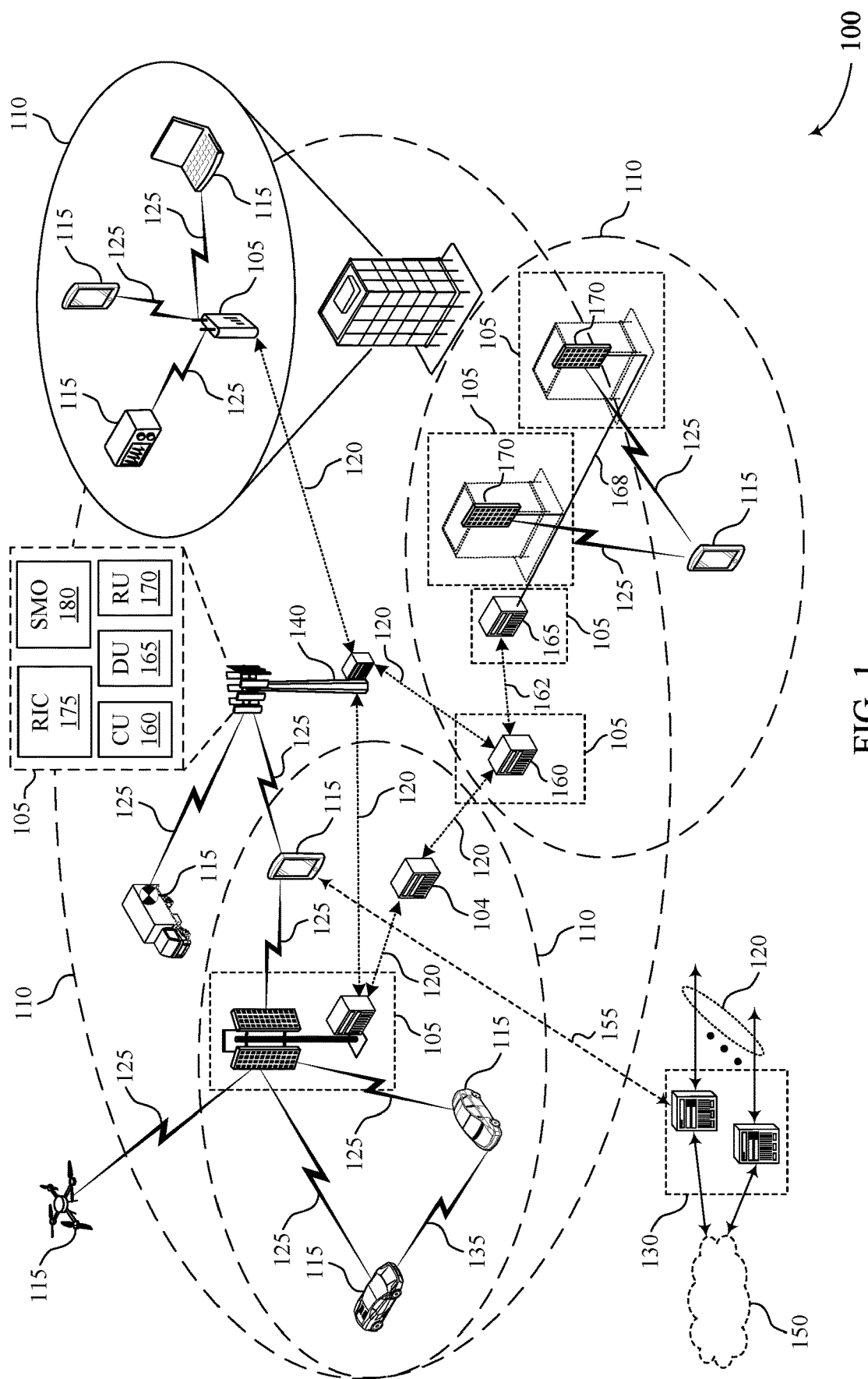
FIG. 1 illustrates an example of a wireless communications system that supports patterns for control channel puncturing and shared channel rate-matching in accordance with one or more aspects of the present disclosure.

In some wireless communications systems, a cell (e.g., a network entity, a base station, an inter-access backhaul (IAB) node, a relay node, or any other service providing cell) may share a portion of a radio frequency spectrum, for example with another cell (e.g., another network entity, another base station, another IAB node, another relay node, or any other service providing cell). For example, a wireless communications system may support dynamic spectrum sharing (DSS), such that multiple network entities (e.g., neighboring network entities) may use a same radio frequency spectrum band or overlapping portions of a same radio frequency spectrum band. In some examples, network entities (or cells) configured to share at least a portion of the radio frequency spectrum (e.g., a carrier) may communicate over different radio access technologies (RATs). That is, a carrier may be shared between multiple RATs (e.g., long term evolution (LTE) and fifth generation (5G) New Radio (NR)), such that the multiple RATs may operate on a common time and frequency resource grid. However, in some examples of an LTE system, communication devices (e.g., user equipments (UEs)) operating within the LTE system may be configured to continuously monitor for reference signals (e.g., LTE reference signals). As a result, for DSS, resources for communication devices operating within the NR system may be assigned around the resources allocated for the LTE reference signals.

For example, a communication device operating in the NR system may be configured to time and frequency multiplex (e.g., rate-match) shared channel signals around resource allocated for the LTE reference signals according to one pattern or multiple patterns. In some examples, however, the communication device operating in the NR system may not be capable of rate-matching shared channel signals around the resources allocated for the LTE reference signals according to multiple patterns that overlap in frequency. For example, if the communication device operating in the NR system is configured to operate in a single transmission and reception point (TRP) mode, the communication device may perform rate-matching according to a single pattern or multiple patterns that may not overlap in frequency. Additionally, or alternatively, the communication device operating in the NR system may not be capable of rate-matching control channel signals around the resources allocated for the LTE reference signals. For example, if a resource of a symbol configured for monitoring the control channel (e.g., for control channel signals) overlaps with one or multiple resources allocated for LTE reference signals, the communication device may not be capable of monitoring for (or receiving) control channel signals during the symbol. As a result, wireless communications between the communication device operating within the NR system and the network may be degraded.

Various aspects of the present disclosure generally relate to techniques that support patterns for control channel puncturing and shared channel rate-matching, and more specifically, to techniques for configuring communication devices with patterns for puncturing control channel signals or rate-matching shared channel signals of a RAT around resources allocated for signals associated with another RAT. For example, the network may configure a communication device with one or multiple lists of patterns to be used by the communication device for shared channel rate-matching, control channel puncturing, or both. The communication device may select one or multiple patterns from the one or multiple lists based on signaling from the network or based on rules configured for the communication device.

For example, the network (one or multiple network entities) may transmit an indication for (e.g., configure) the communication device (e.g., a UE) to operate in a single TRP mode. In some examples, the network may indicate for the UE to operate in a single TRP mode by transmitting an indication of a control resource set (CORESET) configured with a single transmission configuration indicator (TCI) state (e.g., a TCI state corresponding to a single TRP). That is, the network may configure the UE to monitor for signals over a CORESET associated with a single TRP. Additionally, or alternatively, the network may transmit an indication of one or multiple lists of patterns for shared channel rate-matching. In some examples, multiple patterns of a list (or multiple patterns across the lists) may be overlapping in frequency (or non-overlapping in frequency). Accordingly, the UE may perform the shared channel rate-matching according to two or more patterns (e.g., from one or multiple of the lists) that are overlapping in frequency irrespective of whether the UE may be configured to operate in a single TRP mode.

In some examples, the UE may select one or multiple lists for the shared channel rate-matching based on signaling from the network. For example, the network may transmit an indication for the UE to select a list (or multiple lists) from the lists configured at the UE (e.g., by the network). Additionally, or alternatively, the network may transmit an indication for the UE to select a pattern (or multiple patterns) from the lists configured at the UE. In other examples, the UE may select one or multiple lists for the shared channel rate-matching based on one or multiple rules indicated to the UE by the network (or configured at the UE). For example, the network may transmit an indication for the UE to select one or multiple patterns based on an ordering of the patterns within the one or multiple lists. Additionally, or alternatively, the UE may be configured to select one or multiple patterns based on an identifier of the CORESET (e.g., associated with the single TRP).

Additionally, or alternatively, the network may transmit an indication for the UE to perform control channel puncturing according to one or multiple patterns. For example, the network may transmit an indication of one or multiple lists that may include patterns for control channel puncturing. The patterns may be overlapping in frequency or non-overlapping in frequency. In some examples, the one or multiple lists of patterns configured at the UE may be used for both control channel puncturing and shared channel rate-matching. That is, the network may transmit an indication for the UE to perform control channel puncturing according to one or more patterns of a list (or multiple lists) configured at the UE for shared channel rate-matching. In some examples, the UE may select one or multiple lists (or one or multiple patterns from the one or multiple lists) for the control channel puncturing based on signaling from the network or one or more rules indicated to the UE by the network (or configured at the UE). In some examples, the one or multiple lists (or one or multiple patterns) to be used by the UE for the control channel puncturing may be based on one or multiple capability of the UE.

Particular aspects of the subject matter described herein may be implemented to realize one or more of the following potential advantages. In some examples, the techniques employed by the described communication devices may provide benefits and enhancements to the operation of the communication devices (e.g., UEs and network entities), including enabling patterns for control channel puncturing and shared channel rate-matching. For example, operations performed by the described communication devices may provide enhancements to shared channel rate-matching by enabling a communication device operating in a single TRP mode to rate-match shared channel signals of a first RAT around resources allocated for reference of a second RAT based on multiple patterns that are overlapping in frequency. Additionally, or alternatively, operations performed by the described communication devices may provide enhancements to communications between the communication device and the network by enabling the communication device to puncture control channel signals of a first RAT around the resources allocated for the reference signals of the second RAT. In some examples, the operations performed by the described communication devices may support improvements to the reliability of DSS communications, improved spectral efficiency, and increased data rates, among other benefits.

Aspects of the disclosure are initially described in the context of wireless communications systems. Aspects of the disclosure are also described in the context of a network architecture and process flows. Aspects of the disclosure are further illustrated by and described with reference to apparatus diagrams, system diagrams, and flowcharts that relate to patterns for control channel puncturing and shared channel rate-matching.

FIG. 1 illustrates an example of a wireless communications system 100 that supports patterns for control channel puncturing and shared channel rate-matching in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support patterns for control channel puncturing and shared channel rate-matching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part) that is operated according to one or more physical layer channels for a given radio access technology (RAT), such as LTE, LTE-A, LTE-A Pro, or NR. Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 (e.g., a coverage area 110-*a*) of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support techniques for configuring communication devices (e.g., one or multiple UEs 115) with patterns for control channel puncturing and shared channel rate-matching. For example, a UE 115 may receive, from a network entity 105, an indication of a CORESET associated with a first RAT. In some cases, The UE 115 may receive, from the network entity 105, an indication of a pattern for puncturing one or more control signals of the first RAT around resources in the CORESET allocated for reference signals, which may be associated with a second RAT. In response, the UE 115 may communicate the one or more control signals according to the pattern. In some examples, the CORESET may be associated with a TCI state and the UE 115 may receive a message that includes scheduling information for a shared data signal, which may be associated with the first RAT, based on the CORESET. The UE 115 may receive, from the network entity 105, an indication of a pattern for rate-matching the shared data signal around the resources allocated for reference signals associated with the second RAT. In response, the UE 115 may communicate the shared data signal according to the pattern. Such techniques may enable the UE 115 to increase the reliability of wireless communications between the UE 115 and nodes of the network (e.g., network entity 105).

Figure 2:
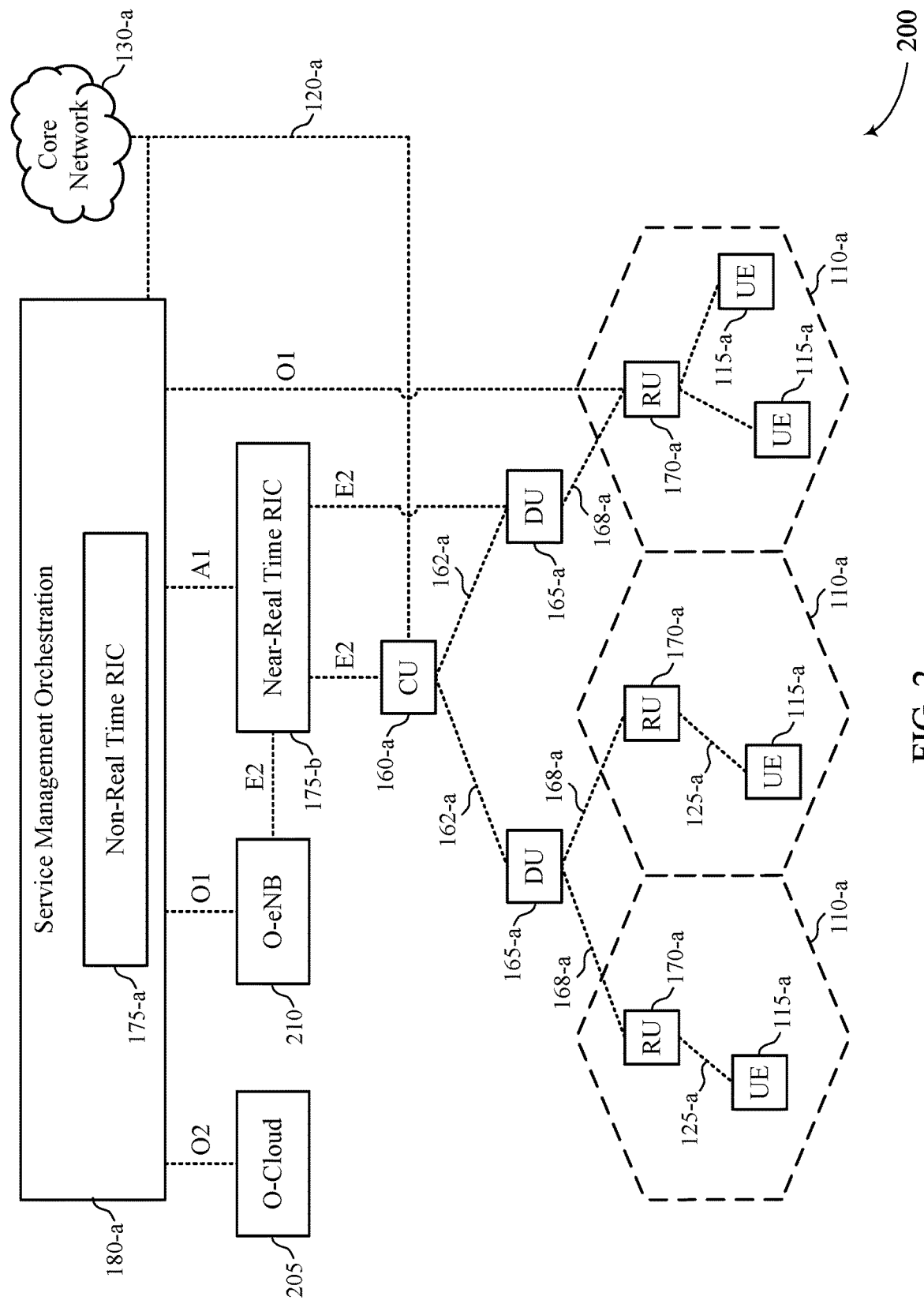
FIG. 2 illustrates an example of a network architecture that supports patterns for control channel puncturing and shared channel rate-matching in accordance with one or more aspects of the present disclosure.

FIG. 2 illustrates an example of a network architecture 200 (e.g., a disaggregated base station architecture, a disaggregated RAN architecture) that supports patterns for control channel puncturing and shared channel rate-matching in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may communicate with respective UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled with or communicate with (e.g., via an AI interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., AI policies).

The network architecture 200 may support techniques for configuring communication devices (e.g., one or multiple UEs 115), with patterns for control channel puncturing and shared channel rate-matching. In some examples, a network entity (e.g., a CU 160-*a*, a DU 165-*a*, an RU 170-*a* or the like) may transmit an indication of a CORESET associated with a first RAT (e.g., 5G or NR). Additionally, or alternatively, the network entity may transmit an indication of a pattern for puncturing one or multiple control signals associated with the first RAT around resources in the CORESET allocated for reference signals associated with a second RAT (e.g., 4G, 3G). In some examples, the network entity may communicate the one or more control signals according to the pattern. In some examples, the CORESET may be associated with a TCI state and the network entity may transmit a message scheduling a shared data signal based on the CORESET. The shared data signal may also be associated with the first RAT. Additionally, or alternatively, the network entity may transmit an indication of a pattern for rate-matching the shared data signal around the resources allocated for the reference signals associated with the second RAT. In some examples, the network entity may communicate the shared data signal according to the pattern.

In some examples, the aforementioned operations of the network entity (e.g., a CU 160-a, a DU 165-a, an RU 170-a) may be performed in accordance with the network architecture 200. For example, higher layer parameters (e.g., RRC parameters) indicative of the pattern for control channel puncturing or shared channel rate-matching may be determined (e.g., selected, configured) by the CU 160-a and communicated to the DU 165-a (e.g., via a midhaul communication link 162-a). In some examples, the DU 165-a may execute control channel puncturing or shared channel rate-matching according to the pattern communicated to the DU 165-a from the CU 160-a (e.g., via the higher layer parameters). For example, the DU 165-a may generate a signal of a first RAT that is rate-matched or punctured around resources allocated for one or multiple reference signals associated with a second RAT according to the pattern. The DU 165-a may communicate the signal to the RU 170-a, for example via a fronthaul communication link 168-a. In some examples, and in response to obtaining the signal generated by the DU 165-a, the RU 170-a may transmit the signal (e.g., OTA) to one or more other communication devices (e.g., one or more UEs 115) via a communication link 125-a. Such techniques may lead to increased reliability of wireless communications between the UEs 115 and the network.

Figure 3:
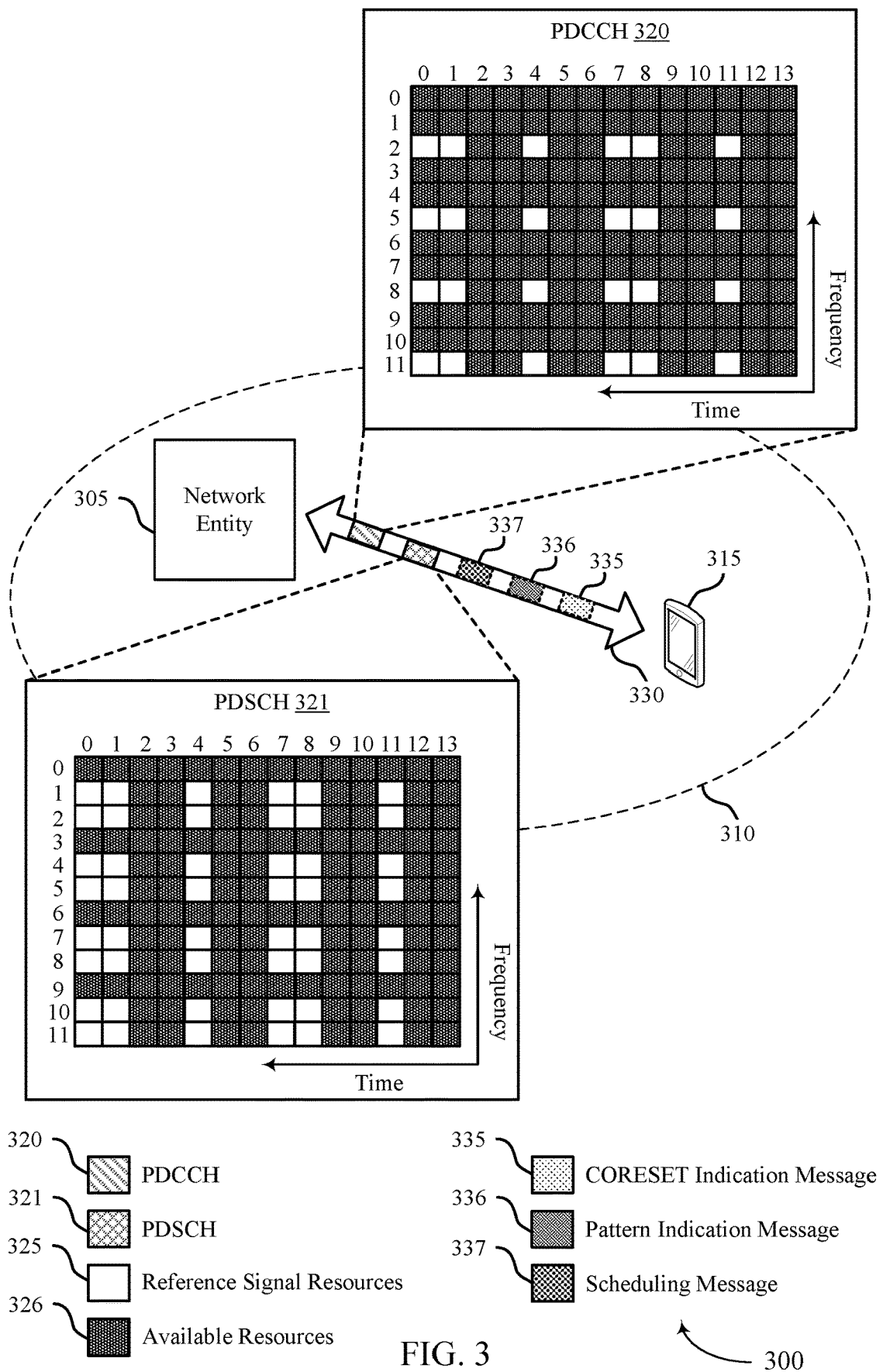
FIG. 3 illustrates an example of a wireless communications system that supports patterns for control channel puncturing and shared channel rate-matching in accordance with one or more aspects of the present disclosure.

FIG. 3 illustrates an example of a wireless communications system 300 that supports patterns for control channel puncturing and shared channel rate-matching in accordance with one or more aspects of the present disclosure. In some examples, the wireless communications system 300 may implement aspects of the wireless communications system 100 and the network architecture 200. For example, the wireless communications system 300 may include a network entity 305 and a UE 315, which may be examples of the corresponding devices as described with reference to FIGS. 1 and 2. The network entity 305 and the UE 315 may communicate within a coverage area 310, which may be an example of a coverage area 110 described with reference to FIG. 1 or 2. In the example of FIG. 3, the coverage area 310 may correspond to a cell and the network entity 305 may be an example of a service providing cell (e.g., a serving cell). In some examples, the network entity 305 and the UE 315 may communicate over the cell via a communication link 330. In the example of FIG. 3, the communication link 330 may be an example of an uplink, a downlink, or one or more other communication links.

In some examples, the wireless communications system 300 may support DSS, such that the network entity 305 may share a portion of a radio frequency spectrum (e.g., a carrier) with another (e.g., neighboring) network entity (not shown).

For example, the network entity 305 may operate via a RAT, such as an NR RAT, and may be configured to use a carrier that is shared between the NR RAT (e.g., an NR system) and one or multiple other RATs, such as an LTE RAT (e.g., an LTE system). In some examples, such operations between the LTE system and the NR system may be referred to as LTE-NR coexistence. In some examples of LTE-NR coexistence, the network entity 305 may support multiple carriers of multiple (e.g., different) RATs. That is, the network entity 305 may support LTE carriers and NR carriers. In some examples, communication devices operating within the LTE system (e.g., over an LTE cell) may be configured to continuously monitor for reference signals (e.g., LTE reference signals). As a result, resource elements (e.g., resources) for communication devices operating within the NR system (e.g., over an NR cell) may be assigned around the resources allocated for the LTE reference signals (e.g., LTE reference signal resources). That is, for LTE-NR coexistence, resources for a communication device operating within the NR system (e.g., the UE 315) may be allocated around LTE reference signal resources (e.g., reference signal resources 325).

In some examples, however, the UE 315 may not be capable of handling control channel signals (e.g., NR control channel signals) that collide with the LTE reference signal resources. For example, the UE 315 may not be capable of rate-matching, puncturing, or cancelling NR control channel signals that occur over resources that overlap with the LTE reference signal resources. For example, if at least one resource of a control channel candidate (e.g., a physical downlink control channel (PDCCH) candidate) configured for monitoring PDCCH signals (e.g., NR PDCCH signals) by the UE 315 (e.g., on a serving cell operating within the NR system, an NR cell supported by the network entity 305) overlaps with at least one resource allocated for the LTE reference signals (e.g., on an LTE cell supported by the network entity 305 or another network entity (not shown)), the UE 315 may not monitor the PDCCH candidate. In some examples, the UE 315 may determine which resources are allocated for LTE reference signals (e.g., which PDCCH candidates may not be monitored) via an indication from the network entity 305. For example, the network entity 305 may indicate which resources are allocated for the LTE reference signals via an information element (IE), such as the lte-CRSToMatchAround IE or the LTE-CRS-PatternList IE. It is to be understood that the names of IEs and fields (e.g., parameters) described herein may change based on implementation of one or multiple devices (e.g., the UE 315, the network entity 305, or both), and the examples described herein should not be considered limiting to the scope covered by the claims or the disclosure.

In some examples, a resource transmission structure (e.g., for downlink transmissions or uplink transmissions) may include a control region and a data region. The control region (e.g., a control channel, a PDCCH) and data region (e.g., a shared data channel, a physical downlink shared channel (PDSCH)) may span a number of modulation symbols in the time domain and a number of subcarriers in the frequency domain. For example, the control region may contain a PDCCH 320, while the data region may contain PDSCH 321. The control region and the data region may overlap in the time domain. In some examples, a PDCCH candidate may span a number (e.g., ranging from one to three) of symbols (e.g., OFDM symbols) of a slot. For example, a PDCCH candidate may span a number of symbols (or other time durations) based on one or multiple parameters configured for the UE 315 (e.g., via an IE, such as a SearchSpace IE and an associated controlResourceSet IE).

In some examples, LTE reference signals may be transmitted over a cell (e.g., on a downlink cell) with a number (e.g., four) of antenna ports. In such examples, the LTE reference signals may be transmitted during (e.g., may occur in) a number of symbols of the PDCCH 320, such as during the symbols with indices 0, 1, 4, 7, 8, and 11 (e.g., and the subcarriers with indices 2, 5, 8, and 11). That is, reference signal resources 325 occurring over the symbols with the indices 0, 1, 4, 7, 8, and 11 and the subcarriers with the indices 2, 5, 8, and 11 may be allocated for LTE reference signal transmissions. As a result, if the UE 315 is configured with a PDCCH candidate (e.g., for receiving NR PDCCH signals) that spans at least one of the symbols with the indices 0 and 1, the UE 315 may not monitor the PDCCH candidate and, as such, may not receive the NR PDCCH signals. Further, while the symbols with the indices 0 and 1 may include available resources 326, reception of the NR PDCCH signals may be disabled for such symbols (e.g., due to the symbols including resources allocated for LTE reference signal transmissions), which may lead to the available resources 326 occurring in the symbols with the indices 0 and 1 not being utilized by the network. For example, the network (e.g., the network entity 305) may avoid scheduling transmission across all subcarriers (e.g., the subcarriers indexed 0-11) of a resource block during symbol durations that include at least one resource allocated for LTE reference signals (e.g., the symbols with the indices 0, 1, 4, 7, 8, and 11). That is, during DSS operations on the cell, a PDCCH candidate (e.g., an NR PDCCH candidate) may not span all symbols of the slot (e.g., may span symbols with the indices 2, 3, 5, 6, 9, 10, 12, and 13 and may not span symbols with the indices 0, 1, 4, 7, 8, and 11), which may result in an underutilization of communication resources, reduced throughput, and increased latency. As such, techniques which enable NR PDCCH reception in symbols with resources allocated for LTE reference signals (e.g., LTE reference signal resources, the reference signal resources 325) may be improve communication reliability and flexibility for wireless devices.

In some examples, puncturing may be used to enable mapping of NR PDCCH candidates on symbols in which LTE reference signal resources are allocated (e.g., present or mapped). For example, patterns for control channel puncturing, as described herein, may provide performance gains for communications between the UE 315 and the network by increasing the utilization of communication resources (e.g., by increasing available PDCCH resources). For example, the UE 315 may receive a CORESET indication message 335 indicating a CORESET associated with an NR RAT. The UE 315 may receive a pattern indication message 336. In some examples, the pattern indication message 336 may indicate a pattern for puncturing one or multiple control signals associated with the NR RAT (e.g., one or multiple NR PDCCH signals) around resources allocated for reference signals associated with an LTE RAT (e.g., LTE reference signal resources). In response, the UE 315 may communicate the one or multiple NR PDCCH signals according to the pattern indicated via the pattern indication message 336. For example, the UE 315 may receive one or multiple NR PDCCH signals (e.g., over the PDCCH 320) that are punctured around the LTE reference signal resources (e.g., the reference signal resources 325) according to the pattern, thereby increasing the utilization of communication resources in the wireless communications system 300 (e.g., increasing the utilization of the available resources 326).

Additionally, or alternatively, the UE 315 may be configured to rate-match shared channel signals associated with the NR RAT (e.g., NR PDSCH signals transmitted over the PDSCH 321) around the reference signal resources 325 (e.g., the LTE reference signal resources) according to one or multiple patterns. The LTE reference signals may, in some examples, be LTE cell-specific reference signals (LTE-CRS). In some examples, the UE 315 may identify the reference signal resources 325 based on signaling from the network entity 305. For example, the network entity 305 may transmit an indication of one or multiple patterns or one or multiple lists of patterns that may account for (e.g., consider) the LTE reference signal resources. That is, the network entity 305 may transmit an indication of one or multiple LTE reference signal patterns or one or multiple lists of LTE reference signal patterns for rate-matching NR PDSCH signals around the LTE reference signal resources (e.g., for NR PDSCH rate-matching). As such, the UE 315 may not be capable of determining (e.g., may not be aware of) whether reference signals are transmitted (e.g., by a communication device operating over the LTE cell) in accordance with the one or multiple patterns. In some examples, the network entity 305 may indicate the one or multiple patterns through higher layer parameters, such as via a RateMachPatternLTE-CRS IE of an RRC configuration. In some examples, the RateMachPatternLTE-CRS IE may be included in the lte-CRS-ToMatchAround field of a ServingCellConfig IE or a ServingCellConfigCommon IE configuring the LTE reference signals (e.g., the LTE-CRS). Additionally, or alternatively, the RateMachPatternLTE-CRS IE may be included in the lte-CRS-PatternList1-r16 field of the ServingCellConfig IE. In some examples (e.g., for 15 kHz subcarrier spacing), the one or multiple patterns may indicate resources that are unavailable for PDSCH transmissions via an LTE carrier in a serving cell (e.g., may be allocated for the LTE reference signals).

For example, the ServingCellConfig IE may include the lte-CRS-ToMatchAround field and the RateMatchPatternLTE-CRS IE which provide (e.g., indicate) one or multiple parameters to determine a pattern of LTE reference signal resources (e.g., an LTE reference signal pattern) that the UE 315 may rate-match around. In some examples, the ServingCellConfig IE may include the lte-CRS-PatterList1-r16 field and a list of RateMatchPatternLTE-CRS IEs. For example, the lte-CRS-PatterList1-r16 field may include a list of LTE reference signal patterns around which the UE 315 may perform NR PDSCH rate-matching. In some examples, the LTE reference signal patterns indicated via the lte-CRS-PatterList1-r16 field may be non-overlapping in frequency. For example, the network entity 305 may not configure the UE 315 with multiple parameters that are indicative of patterns that overlap in frequency. That is, the network entity 305 may not configure the lte-CRS-PatterList1-r16 field and lte-CRS-ToMatchAround field simultaneously. Additionally, or alternatively, in some examples, rate-matching may not be used for resources allocated for demodulation reference signal (DMRS) transmissions (e.g., NR DMRS transmissions by the network entity 305).

In some examples, the UE 315 may receive one or multiple patterns (e.g., LTE reference signal patterns) from the network entity 305 (e.g., the serving cell, a cell likely to be transmitting NR PDSCH signals). For example, the UE 315 may be configured with an LTE reference signal pattern that corresponds to a particular network entity (e.g., the network entity 305) that supports both an LTE carrier and an NR carrier (e.g., a carrier shared between the LTE system and the NR system that the UE 315 may be operating over). In some examples, the network entity 305 may configure the UE 315 with multiple LTE reference signal patterns (e.g., for the network entity 305 and on or more other network entities (not shown)). For example, the UE 315 may be operating over an NR cell supported by the network entity 305 and may experience interference from LTE reference signal transmissions (e.g., over LTE cells) from other network entities (not shown). As such, the network entity 305 may configure the UE 315 with an LTE reference signal pattern for each of the other network entities (e.g., for the network entities transmitting LTE reference signals over the LTE cells).

In some instances, the LTE reference signal patterns for the multiple LTE cells may not overlap in frequency. For example, the LTE reference signal patterns may not overlap in frequency if the bandwidth used by the NR cell (e.g., the NR carrier bandwidth) is greater than the bandwidth used by the LTE cells (e.g., the LTE carrier bandwidth) associated with the multiple LTE reference signal patterns. In such examples, the UE 315 may rate-match NR PDSCH signals from the network entity 305 (e.g., transmitted over the NR cell) according to one LTE reference signal pattern (e.g., associated with a first LTE cell) for a portion of the NR carrier bandwidth and another LTE reference signal pattern (e.g., associated with a second LTE cell) for another portion of the NR carrier bandwidth. In other instances, the LTE reference signal patterns for the multiple LTE cells may overlap in frequency. In such instances, the UE 315 may rate-match PDSCH signals from the network entity 305 according to both LTE reference signal patterns across multiple (e.g., a subset or all) portions of the NR carrier bandwidth. For example, the UE 315 may rate-match PDSCH signals around the reference signal resources 325 of the PDSCH 321, such as the reference signal resources 325 that occur during the symbols with indices 0, 1, 4, 7, 8, and 11 and the subcarriers with indices 1, 2, 4, 5, 7, 8, 10, and 11 (e.g., where subcarriers with indices 1, 4, 7, and 10 may be allocated for reference signals of transmitted over the first LTE cell and subcarriers with indices 2, 5, 8, and 11 may be allocated for reference signals transmitted over the second LTE cell).

In some examples, however, the UE 315 may not be capable of NR PDSCH rate-matching according to multiple overlapping LTE reference signal patterns if the UE 315 is operating in a single TRP mode (e.g., during single TRP operations). For example, the network entity 305 may configure the UE 315 with a second list of LTE reference signal patterns based on a value of an indicator configured for a CORESET. For example, the ServingCellConfig IE may include an lte-CRS-PatterList2-r16 field and a list of RateMatchPatternLTE-CRS IEs that may indicate another list of LTE reference signal patterns around which the UE 315 may perform rate-matching for NR PDSCH signals that are scheduled with a downlink control information (DCI) detected on a CORESET configured with an indicator set to 1 (e.g., the value of the CORESETPoolIndex field is set to 1). That is, the network entity 305 may configure the UE 315 with such a list if the UE 315 is also configured to operate in a multiple TRP mode (e.g., to perform multi-TRP operations).

In some examples, a first LTE reference signal pattern in the lte-CRS-PatterList2-r16 field may be overlapping in frequency with a first LTE reference signal pattern of another list, such as indicated via the lte-CRS-PatternList1 field. Additionally, or alternatively, a second LTE reference signal pattern in the lte-CRS-PatterList2-r16 field may be overlapping in frequency with a second LTE reference signal pattern of the list indicated via the lte-CRS-PatternList1 field. That is, the patterns of a first list (e.g., the list indicated via the lte-CRS-PatterList2-r16 field) may be overlapping with the patterns of a second list (e.g., indicated via the lte-CRS-PatternList1 field). In some examples, the network entity 305 may configure the lte-CRS-PatterList2-r16 field if the lte-CRS-ToMatchAround field is not configured (e.g., and there is at least one CORESET in the downlink bandwidth of the serving cell with the coresetPoolIndex field set to 1). That is, if the UE 315 is configured through a higher layer parameter, such as via the PDCCH-Config IE, with multiple (e.g., two) values for the coresetPoolIndex field (e.g., in the ControlResourceSet IE) and is also configured with both the lte-CRS-PatternList1 field and the lte-CRS-PatterList2-r16 field (e.g., in the ServingCellConfig IE), the resources not available for NR PDSCH transmissions (e.g., resources in which the UE 315 may rate-match around) may be based on the value of the coresetPoolIndex field.

For example, if the UE 315 is configured with a crs-RateMatch-PerCoresetPoolIndex IE and the value of the coresetPoolIndex field is set to 0, the UE 315 may perform the NR PDSCH rate-matching according to LTE reference signal patterns of a first list (e.g., indicated via the lte-CRS-PatternList1 field). Additionally, or alternatively, if the UE 315 is configured with the crs-RateMatch-PerCoresetPoolIndex IE and the value of the coresetPoolIndex field is set to 1, the UE 315 may perform the NR PDSCH rate-matching according to LTE reference signal patterns of a second list (e.g., indicated via the lte-CRS-PatterList2-r16 field). Additionally, or alternatively, if the UE 315 is not configured with the crs-RateMatch-PerCoresetPoolIndex IE, the UE 315 may perform NR PDSCH rate-matching according to both the first list (e.g., indicated via the lte-CRS-PatternList1 field) and the second list (e.g., indicated via the lte-CRS-PatterList2-r16 field).

For example, the UE 315 may rate-match PDSCH signals according to multiple overlapping LTE reference signal patterns if the UE 315 is configured with a CORESET associated with multiple TCI states that may each correspond to a respective TRP (e.g., via the coresetPoolIndex field being set to 1). That is, the UE 315 may rate-match PDSCH signals according to multiple overlapping LTE reference signal patterns if the UE 315 is configured to perform multi-TRP operations. In some examples of multi-TRP operations, each TRP may schedule PDSCH transmissions (e.g., NR PDSCH transmissions) via respective DCI messages (i.e., multi-TRP operation may be performed using multi-DCI). Additionally, or alternatively, the UE 315 may not be capable of NR PDSCH rate-matching according to multiple overlapping LTE reference signal patterns if the UE 315 is configured with a CORESET associated with a single TCI state that corresponds to a respective TRP (e.g., via the coresetPoolIndex field being set to 0). That is, the UE 315 may not rate-match PDSCH signals according to multiple overlapping LTE reference signal patterns if the UE 315 is configured to operate in a single TRP mode (e.g., perform single TRP operations). For example, the UE 315 may be configured (e.g., jointly) to perform NR PDSCH rate-matching according to one pattern or multiple overlapping patterns during multi-TRP operations and according to one pattern or multiple non-overlapping patterns during single TRP operations. However, such techniques may inflexible and unsuitable for some communication scenarios.

In other examples, the UE 315 may be configured to support (e.g., and may be configured with), multiple overlapping LTE reference signal patterns irrespective of support by the UE 315 for multi-TRP operations (or configuration of the UE 315 for the multi-TRP operations). For example, the UE 315 may receive an indication of a CORESET associated with an NR RAT and a TCI state corresponding to a particular TRP. The UE 315 may receive a scheduling message 337 scheduling a shared data signal (e.g., an NR PDSCH signal to be transmitted over the PDSCH 321) based on the CORESET. The UE 315 may receive the pattern indication message 336. In some examples, the pattern indication message 336 may indicate a pattern (e.g., an LTE reference signal pattern) for rate-matching the NR PDSCH signal around resources allocated for one or multiple reference signals associated with the second an LTE RAT (e.g., LTE reference signal resources). In response, the UE 315 may communicate the NR PDSCH signal according to the pattern indicated via the pattern indication message 336. For example, the UE 315 may receive the NR PDSCH signal over the PDSCH 321 and the NR PDSCH signal may be rate-matched around the LTE reference signal resources (e.g., the reference signal resources 325) according to the LTE reference signal pattern. Such techniques may provide one or more improvements for spectrum efficiency, such as during DSS (e.g., for LTE-NR co-existence).

Figure 4:
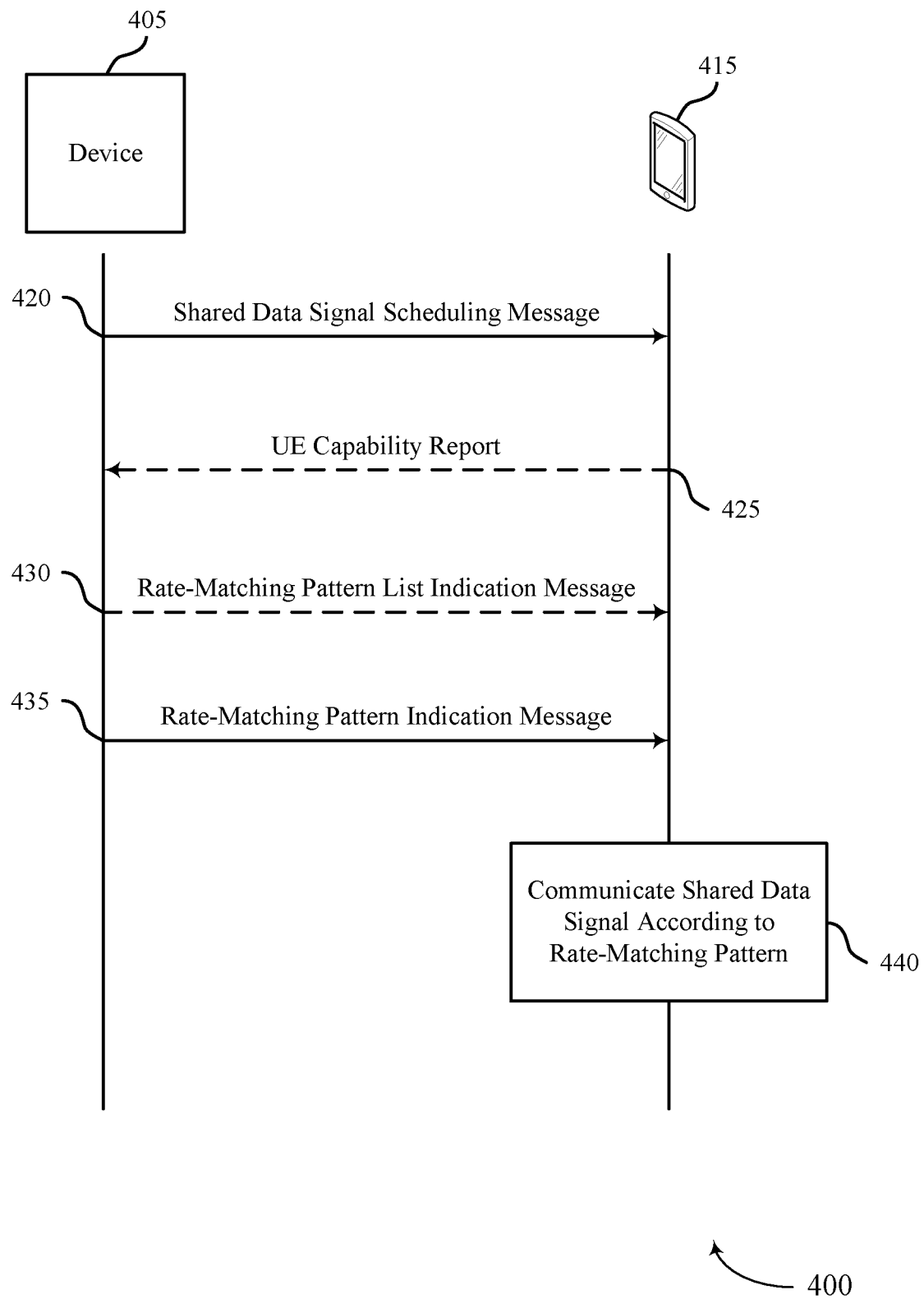
FIGS. 4 and 5 each illustrate an example of a process flow that supports patterns for control channel puncturing and shared channel rate-matching in accordance with one or more aspects of the present disclosure.

FIG. 4 illustrates an example of a process flow 400 that supports patterns for control channel puncturing and shared channel rate-matching in accordance with one or more aspects of the present disclosure. The process flow 400 may implement or be implemented by one or more aspects of the wireless communications system 100, the network architecture 200, and the wireless communications system 300. For example, the process flow 400 may include a network entity 405 and a UE 415, which may be examples of the corresponding devices as described with reference to FIGS. 1 through 3. The process flow 400 may be implemented by the network entity 405, the UE 415, or both. In the following description of the process flow 400, operations between the network entity 405 and the UE 415 may occur in a different order or at different times than as shown. Some operations may also be omitted from the process flow 400, and other operations may be added to the process flow 400.

A wireless communications network may configure communication devices (e.g., the UE 415) with multiple patterns for rate-matching shared data channel signals of a first RAT (e.g., an NR PDSCH signal) around resources allocated for reference signals of a second RAT (e.g., LTE reference signal resources). In some examples, the network (e.g., the network entity 405) may configure the UE 415 with multiple overlapping patterns for rate-matching NR PDSCH signals around the LTE reference signal resources (e.g., NR PDSCH rate-matching) irrespective of whether the UE 415 is configured for multi-TRP operations. For example, at 420, the UE 415 may receive a first message (e.g., a shared data signal schedule message) from the network entity 405 scheduling a shared data signal associated with the first RAT (e.g., the NR PDSCH signal). In some examples, the UE 415 may receive the shared data scheduling message based on a CORESET associated with a TCI state (e.g., corresponding to a TRP). For example, the network entity 405 may schedule the NR PDSCH signal for the UE 415 via a DCI message detected on a CORESET configured with an indicator set to 0 (e.g., the CORESETPoolIndex field is set to 0).

At 435, the UE 415 may receive a second message (e.g., a rate-matching pattern indication message) indicating a pattern (e.g., an LTE reference signal pattern) for NR PDSCH rate-matching. In some examples, the LTE reference signal pattern (e.g., indicated via the rate-matching pattern indication message received at 435) may be selected from (e.g., may be based on, may include) one or multiple LTE reference signal patterns from one or multiple lists configured for the UE 415 (e.g., indicated to the UE 415 via the network entity 405). For example, at 430, the UE 415 may receive another message (e.g., a rate-matching pattern list indication message) indicating one or more lists of LTE reference signal patterns (e.g., via the lte-CRS-PatternList1 field, the lte-CRS-PatterList2-r16 field, or both) for NR PDSCH rate-matching.

In some examples, the UE 415 may receive the rate-matching pattern list indication message based on one or more capabilities of the UE 415. For example, at 425, the UE 415 may transmit a report (e.g., a UE capability report) indicating one or multiple UE capabilities associated with NR PDSCH rate-matching. In such an example, the UE 415 may receive the rate-matching pattern list indication message (e.g., received at 430) based on the one or multiple UE capabilities. In some examples, the rate-matching pattern list indication message may indicate multiple (e.g., two) lists in which the LTE reference signal patterns may be overlapping in frequency or non-overlapping in frequency. For example, the network entity 405 may enable multiple LTE reference signal patterns (e.g., multiple entries, two entries) of a list to overlap in frequency. As such, the NR PDSCH signals (e.g., scheduled for the UE 415 via the shared data signal schedule message received at 420) may be rate-matched around the LTE refence signal resources according to the entries of a single list. For example, the NR-PDSCH signal may be rate matched around the LTE reference signal resources according to LTE reference signal patterns of a list indicated via the lte-CRS-PatternList1 field, the lte-CRS-PatterList2-r16 field, or one or more other fields indicative of other lists different from the lists indicated via the lte-CRS-PatternList1 field and the lte-CRS-PatterList2-r16 field. In some examples, the network entity 405 may configure the UE 415 with lists in which the LTE reference signal patterns are overlapping in frequency (or non-overlapping in frequency) based on one or more capabilities of the UE 415. For example, the network entity 405 may enable the entries of a list to overlap in frequency if UE 415 indicates (e.g., declares) support of for NR PDSCH rate-matching via multiple overlapping patterns (e.g., via the UE capability report). That is, the network entity 405 may configure the UE with one or multiple list that include LTE reference signal patterns that overlap in frequency based on the UE capability report.

Additionally, or alternatively, the network entity 405 may configure (e.g., via an RRC configuration) the UE 415 to rate-match the NR PDSCH signals around the LTE reference signal resources according to the entries of a list based on a value of an indicator (e.g., the value of the CORESET-PoolIndex field) configured for the CORESET (e.g., a CORESET associated with the search space over which the DCI scheduling NR PDSCH signals is receive by the UE 415). For example, the network entity 405 may configure the UE 415, such that the NR-PDSCH signals may be rate-matched around LTE reference signal resources according to a first list if the NR PDSCH signals are scheduled by a DCI message (e.g., format) detected over a search space associated with a CORESET configured with an indicator set to 0 (e.g., the coresetPoolIndex field is set to 0). Additionally, or alternatively, the network entity 405 may configure the UE 415, such that the NR-PDSCH signals may be rate-matched around LTE reference signal resources according to a second list (e.g., different from the first list) if the NR PDSCH signals are scheduled by a DCI message detected over a search space associated with a CORESET configured with an indicator set to 1 (e.g., the coresetPoolIndex field is set to 1).

Additionally, or alternatively, the entries of the first list may be overlapping in frequency (or non-overlapping in frequency) with the entries of the second list. For example, the network entity 405 may enable one or more entries (e.g., the nth entry) of the first list (e.g., indicated via lte-CRS-PatternList1 field) and one or more entries (e.g., the nth entry) of the second list (e.g., indicated via the lte-CRS-PatterList2-r16 field) to overlap in frequency. That is, the network entity 405 may enable an LTE reference signal pattern of the first list associated with a particular pattern index (e.g., the nth pattern of the first list) to overlap with an LTE reference signals pattern of the second list associated with a same pattern index (e.g., the nth pattern of the first list). As such, the NR PDSCH signals (e.g., scheduled for the UE 415 via the shared data signal schedule message received at 420) may be rate-matched around the LTE reference signal resources according to the entries of multiple lists (e.g., indicated via the lte-CRS-PatternList1 field, the lte-CRS-PatterList2-r16 field, or one or more other fields indicative of other lists different from the lists indicated via the lte-CRS-PatternList1 field and the lte-CRS-PatterList2-r16 field). In some examples, the network entity 405 may configure the UE 415 with lists in which the entries are overlapping in frequency irrespective of whether the UE 415 is configured for multi-TRP operations. That is, the network entity 405 may configure (e.g., via the RRC configuration) the UE 415 with lists in which the LTE reference signal patterns are overlapping in frequency irrespective of the value of an indicator (e.g., the value of the CORESET-PoolIndex field) configured to the CORESET (e.g., the CORESET over which the DCI scheduling NR PDSCH signals is received by the UE 415).

At 440, the UE 415 may communicate the NR PDSCH signal according to the LTE reference signal pattern (e.g., indicated via the rate-matching pattern indication message received at 435). For example, the UE 315 may receive one or more PDSCH signals that are rate-matched around the LTE reference signal resources. In some examples, such techniques may provide one or more improvements for NR spectrum efficiency for LTE and NR co-existence.

Figure 5:
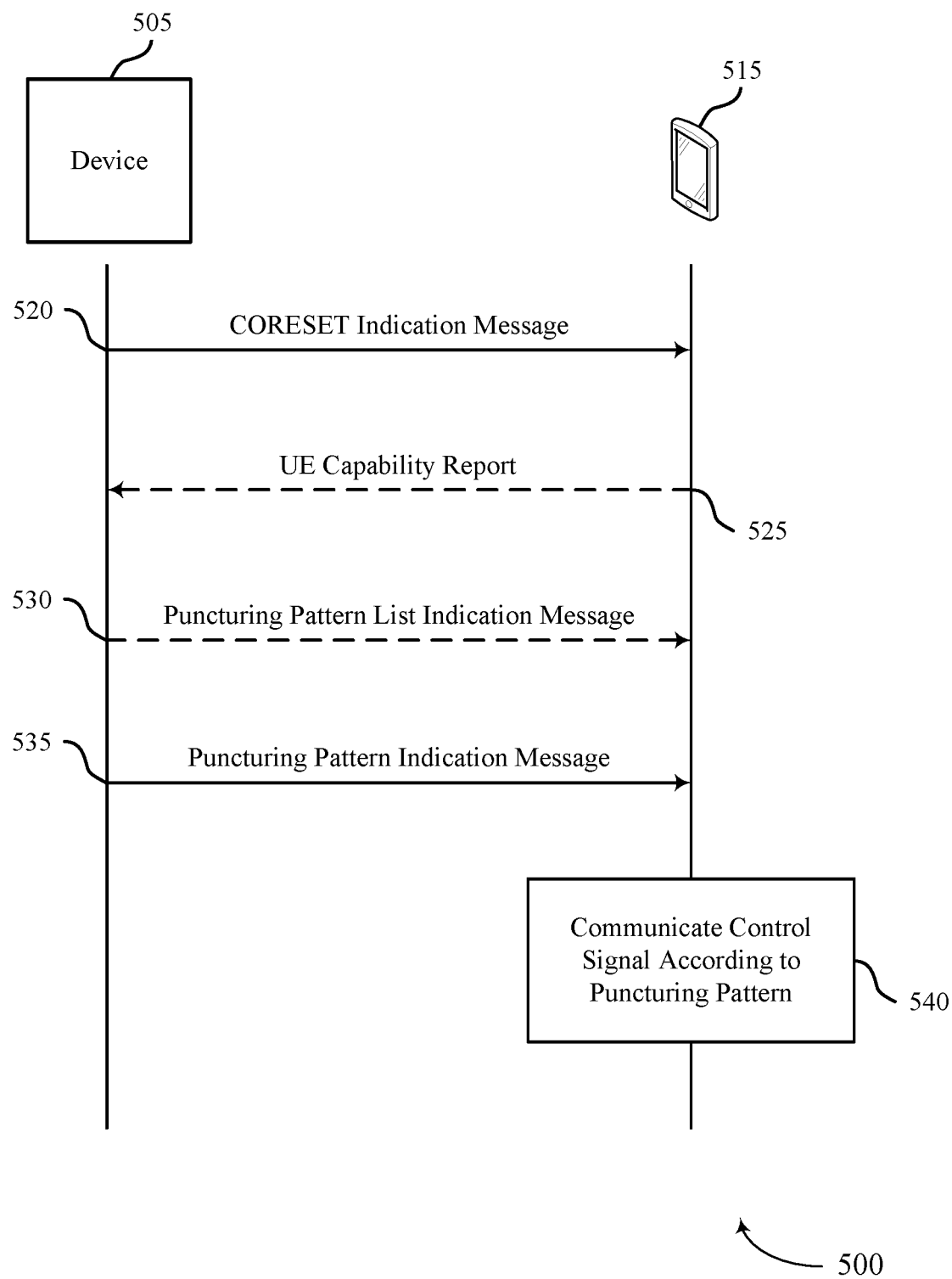

FIG. 5 illustrates an example of a process flow 500 that supports patterns for control channel puncturing and shared channel rate-matching in accordance with one or more aspects of the present disclosure. The process flow 500 may implement or be implemented by one or more aspects of the wireless communications system 100, the network architecture 200, and the wireless communications system 300. For example, the process flow 500 may include a network entity 505 and a UE 515, which may be examples of the corresponding devices as described with reference to FIGS. 1 through 3. The process flow 500 may be implemented by the network entity 505, the UE 515, or both. In the following description of the process flow 500, operations between the network entity 505 and the UE 515 may occur in a different order or at different times than as shown. Some operations may also be omitted from the process flow 500, and other operations may be added to the process flow 500.

A wireless communications network (e.g., the network entity 505) may configure communications devices (e.g., the UE 515) with one or more patterns for puncturing control channel signals of a first RAT (e.g., NR PDCCH signals) around resources allocated for reference signals of a second RAT (e.g., LTE reference signal resources). For example, at 520, the UE 515 may receive a first message (e.g., a CORESET indication message) indicating a CORESET associated with an NR RAT. At 535, the UE 515 may receive a second message (e.g., a puncturing pattern indication message) indicating a pattern (e.g., an LTE reference signal pattern) for puncturing one or more NR PDCCH signals around the LTE reference signal resources (e.g., for NR PDCCH puncturing). In some examples, the LTE reference signal pattern indicated via the puncturing pattern indication message (e.g., received at 535) may be based on an LTE reference signal pattern indicated to the UE 515 for NR PDSCH rate-matching. For example, the network entity 505 may configure the UE 515 (e.g., via the puncturing pattern indication message received at 535) to perform NR PDCCH puncturing according to an LTE reference signal pattern for NR PDSCH rate-matching, such as indicated via the lte-CRS-ToMatchAround IE. Additionally, or alternatively, the UE 515 may configure the UE 515 to perform NR PDCCH puncturing according to an LTE reference signal pattern irrespective of whether (or how) the NR PDSCH rate-match is configured. For example, the UE 515 may be configured to perform NR PDCCH puncturing based on an LTE reference signal pattern indicated for NR PDCCH puncturing via another IE, such as the lte-CRS-ToMatchAround IE (or another IE that indicates resource elements allocated for LTE reference signals).

In some examples, the LTE reference signal pattern for NR PDCCH puncturing (e.g., indicated via the puncturing pattern indication message received at 535) may be selected from (e.g., may be based on, may include) one or multiple LTE reference signal patterns from one or multiple lists configured for the UE 515 (e.g., indicated to the UE 515 via the network entity 505). For example, at 530, the UE 515 may receive another message (e.g., a puncturing pattern list indication message) indicating one or more lists of LTE reference signal patterns for NR PDCCH puncturing. In some examples, the network entity 405 may configure the UE 515 to perform NR PDCCH puncturing according to one or multiple LTE reference signal patterns of lists configured for NR PDSCH rate-matching. In such an example (e.g., if the UE 515 is configured with the one or multiple lists for NR PDSCH rate-matching), the NR PDCCH puncturing may be based on one or multiple entries of the one or multiple lists (e.g., one or more LTE reference signal patterns from one or more of the lists indicated via the puncturing pattern indication message received at 535). In some examples, the network entity 505 may indicate, to the UE 515, the one or more lists for NR PDSCH rate-matching via the lte-CRS-PatternList1 field, the lte-CRS-PatterList2-r16 field, or one or more other fields indicative of other lists different from the lists indicated via the lte-CRS-PatternList1 field and the lte-CRS-PatterList2-r16 field. Additionally, or alternatively, the network entity 505 may configure the UE 515 to perform NR PDCCH puncturing according to one or multiple LTE reference signal patterns of one or multiple lists irrespective of whether (or how) NR PDSCH rate-matching is configured. That is, the network may configure the UE 515 to perform NR-PDCCH signal puncturing based on the another IE that provides one or multiple lists of LTE reference signal patterns for NR PDCCH puncturing.

For example, the LTE reference signal patterns for NR PDCCH puncturing may be based on an entry from one list, multiple entries (e.g., all entries) from one list, one entry from each of multiple lists, or multiple entries (e.g., all entries) from each of the multiple lists. That is, the UE 515 may perform the NR PDSCH signal puncturing according to an LTE reference signal pattern selected from one entry of one list, multiple entries (e.g., all entries) from one list, one entry from each of multiple lists, or multiple entries (e.g., all entries) from each of the multiple lists. In some examples, the UE 515 may be configured to select an entry (e.g., an LTE reference signal pattern) based on signaling from the network entity 505 (e.g., via an RRC configuration). Additionally, or alternatively, the UE 515 may select an LTE reference signal pattern according to a position of the LTE reference signal pattern within the lists (e.g., a pattern position) that may be fixed (e.g., defined, such as a first entry of a list) or configured by the network entity 505 (e.g., via the RRC configuration).

In some examples, the UE 515 may determine to perform the NR PDCCH puncturing according to one or multiple entries (e.g., all entries) of a list configured for NR PDSCH rate-matching (e.g., indicated via the lte-CRS-PatternList1 field or the lte-CRS-PatternList2 field) depending on the value of an indicator (e.g., the value of the coresetPoolIndex field) configured to the CORESET that is associated with the search space in which the UE 515 monitors for the NR PDCCH signals. For example, if the UE 515 monitors for NR PDCCH signals in a search space associated with a CORESET configured with an indicator set to 0 (e.g., the value of the coresetPoolIndex is set to 0), the LTE reference signal pattern for NR PDCCH puncturing may be based on a first list (e.g., indicated via the lte-CRS-PatternList1 IE). Additionally, or alternatively, if the UE 515 monitors for NR PDCCH signals in a search space associated with a CORESET configured with an indicator set to 1 (e.g., the value of the coresetPoolIndex is set to 1), the LTE reference signal pattern for NR PDCCH puncturing may be based on a second list (e.g., indicated via the lte-CRS-PatternList2 IE). In some examples, the CORESET (e.g., for monitoring for NR PDCCH signals) may be configured with two TCI states (e.g., corresponding to two TRPs). In such an example, the UE 515 may be configured to support monitoring for NR PDCCH signals from the two TRPs (e.g., may be configured to perform multi-TRP operations) and may be further configured with a system frame number (e.g., via the sfn-SchemePdcch field, the sfnSchemeA field, or the sfn-SchemeB field) for the monitoring. In such examples (e.g., for NR PDCCH signal reception from multiple TRPs), NR PDCCH puncturing may be based on multiple (e.g., two) lists of LTE reference signal patterns (e.g., a list for each of the two TRPs).

Additionally, or alternatively, the UE 515 may determine to perform the NR PDCCH puncturing according to one or multiple entries (e.g., LTE reference signal patterns) of a list depending on the value of an indicator (e.g., the value of the coresetPoolIndex field) configured for the CORESET that is associated with the search space in which the UE 515 monitors for the NR PDCCH signals and irrespective of whether (or how) the NR PDSCH rate-matching is configured. For example, the UE 515 may perform NR PDCCH puncturing based on a list of NR PDCCH puncturing patterns depending on the value of the indicator (e.g., the value of the coresetPoolIndex field) configured to the CORESET that is associated with the search space monitored by the UE 515 for NR PDCCH signals. In some examples, the UE 515 may perform the NR PDCCH puncturing based on one list or multiple lists (e.g., all lists) that include LTE reference signal patterns for NR PDCCH puncturing. In some examples, the one or multiple lists of LTE reference signal patterns for NR PDCCH puncturing may be configured for the UE 515 via signaling from the network (e.g., based on an RRC configuration). For example, the one or multiple lists of LTE reference signal patterns for NR PDCCH puncturing may be configured via the crs-RateMatch-Per-CoresetPoolIndex IE or another IE that indicates one or multiple lists of LTE reference signal patterns for NR PDCCH puncturing.

In some examples, the LTE reference signal pattern for NR PDCCH puncturing (e.g., indicated via the puncturing pattern indication message received at 535) may be based on one or multiple UE capabilities. For example, at 525, the UE 515 may transmit a report (e.g., a UE capability report) indicating at least one UE capability associated with puncturing NR PDCCH signals around the LTE reference signal resources. In such an example, the puncturing pattern indication message (e.g., received by the UE 515 at 535) may be based on the UE capability report. In some examples, the UE 515 may report a number (e.g., a maximum number or an otherwise suitable number) of LTE reference signal patterns for NR PDCCH puncturing via the UE capability report (e.g., signaling) transmitted at 525. In some examples, the UE 515 may report a number (e.g., a maximum number or otherwise acceptable number) of LTE reference signal patterns that may be configured for NR PDCCH puncturing in a serving cell (e.g., the network entity 505), a number (e.g., a maximum number or otherwise acceptable number) of LTE reference signal patterns that may overlap in frequency and that may be configured for NR PDCCH puncturing in a serving cell, a number (e.g., a maximum number or otherwise acceptable number) of LTE reference signal patterns that may not overlap in frequency and that can be configured for NR PDCCH puncturing in a serving cell, or a number (e.g., a maximum number or otherwise acceptable number) of CORESETs that may be enabled for NR PDCCH puncturing (e.g., per downlink bandwidth part or per serving cell). At 540, and in response to receive the puncturing pattern indication message received at 535, the UE 515 may communicate the one or more NR PDCCH signals according to the LTE reference signal pattern. For example, the UE 515 may receive one or more NR PDCCH signals that are punctured around the LTE reference signal resources according to the LTE reference signal pattern. In some examples, by puncturing NR PDCCH signals around LTE reference signal resources according a pattern (e.g., an LTE reference signal pattern), the UE 515 may increase the utilization of network communication resources.

Figure 6:
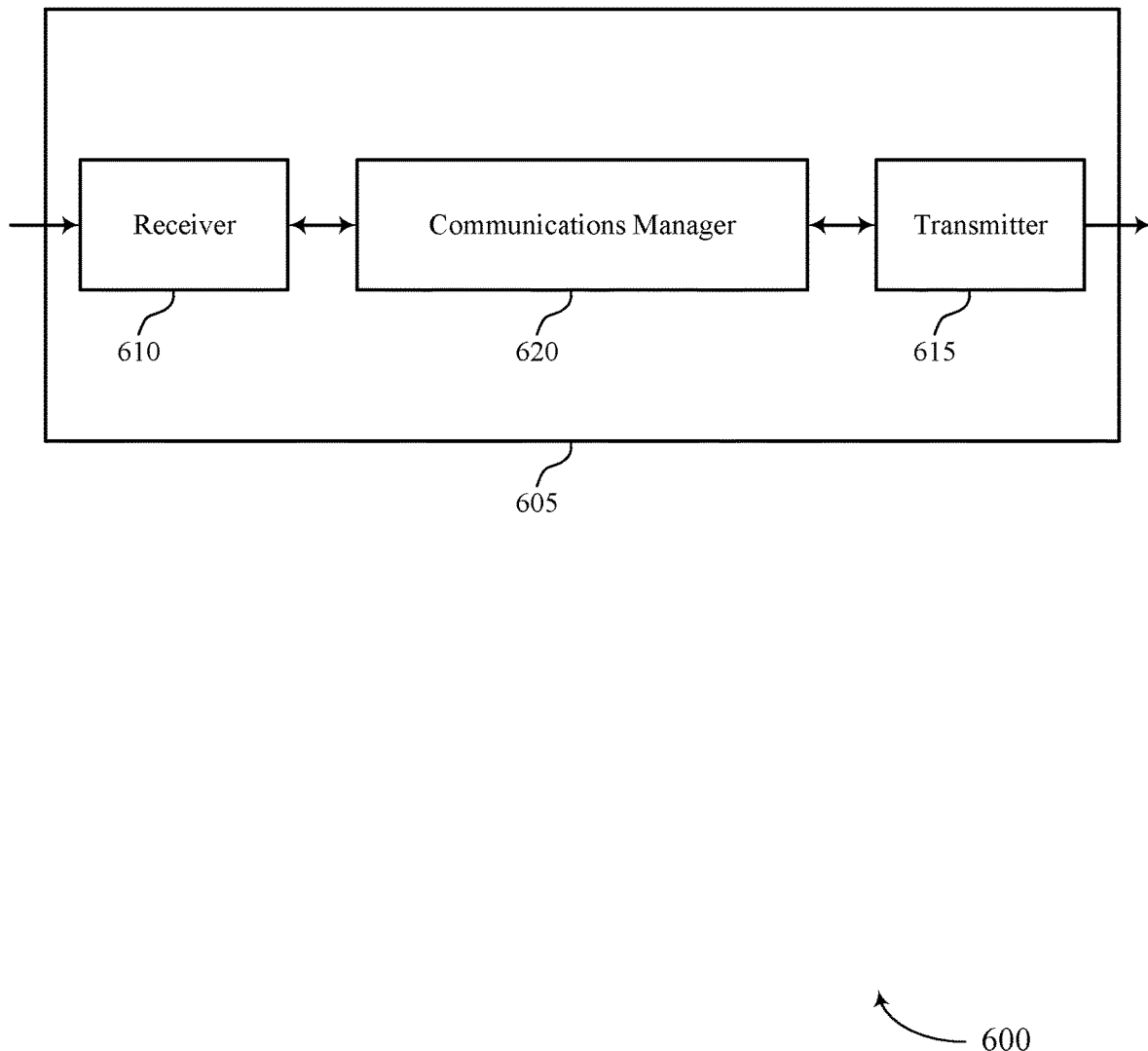
FIGS. 6 and 7 show block diagrams of devices that support patterns for control channel puncturing and shared channel rate-matching in accordance with one or more aspects of the present disclosure.

FIG. 6 shows a block diagram 600 of a device 605 that supports patterns for control channel puncturing and shared channel rate-matching in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to patterns for control channel puncturing and shared channel rate-matching). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to patterns for control channel puncturing and shared channel rate-matching). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of patterns for control channel puncturing and shared channel rate-matching as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE (e.g., the device 605) in accordance with examples as disclosed herein. For example, the communications manager 620 may be configured as or otherwise support a means for receiving a first message based on a CORESET associated with a TCI state, the first message scheduling at least one shared data signal associated with a first RAT. The communications manager 620 may be configured as or otherwise support a means for receiving a second message indicating a pattern for rate-matching the at least one shared data signal around resources allocated for one or more reference signals associated with a second RAT. The communications manager 620 may be configured as or otherwise support a means for communicating the at least one shared data signal in accordance with the pattern.

Additionally, or alternatively, the communications manager 620 may support wireless communication at a UE in accordance with examples as disclosed herein. For example, the communications manager 620 may be configured as or otherwise support a means for receiving a first message indicating a CORESET associated with a first RAT. The communications manager 620 may be configured as or otherwise support a means for receiving a second message based on the CORESET, the second message indicating a pattern for puncturing at least one control signal associated with the first RAT around resources allocated in the CORESET for reference signals associated with a second RAT. The communications manager 620 may be configured as or otherwise support a means for communicating the at least one control signal in accordance with the pattern.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources, among other benefits.

Figure 7:
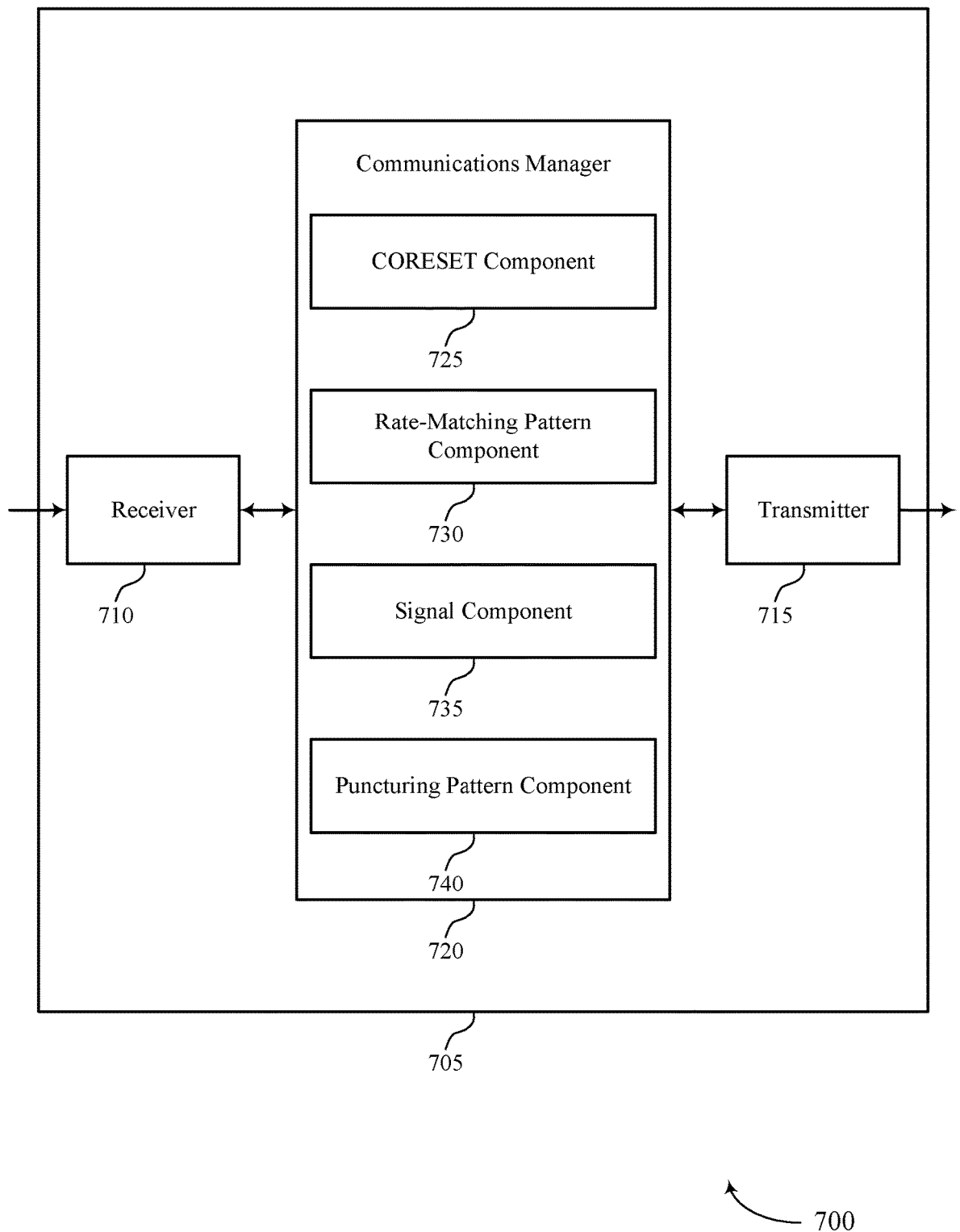

FIG. 7 shows a block diagram 700 of a device 705 that supports patterns for control channel puncturing and shared channel rate-matching in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to patterns for control channel puncturing and shared channel rate-matching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to patterns for control channel puncturing and shared channel rate-matching). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of patterns for control channel puncturing and shared channel rate-matching as described herein. For example, the communications manager 720 may include a CORESET component 725, a rate-matching pattern component 730, a signal component 735, a puncturing pattern component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The CORESET component 725 may be configured as or otherwise support a means for receiving a first message based on a CORESET associated with a TCI state, the first message scheduling at least one shared data signal associated with a first RAT. The rate-matching pattern component 730 may be configured as or otherwise support a means for receiving a second message indicating a pattern for rate-matching the at least one shared data signal around resources allocated for one or more reference signals associated with a second RAT. The signal component 735 may be configured as or otherwise support a means for communicating the at least one shared data signal in accordance with the pattern.

Additionally, or alternatively, the communications manager 720 may support wireless communication at a UE (e.g., the device 705) in accordance with examples as disclosed herein. The CORESET component 725 may be configured as or otherwise support a means for receiving a first message indicating a CORESET associated with a first RAT. The puncturing pattern component 740 may be configured as or otherwise support a means for receiving a second message based on the CORESET, the second message indicating a pattern for puncturing at least one control signal associated with the first RAT around resources allocated in the CORESET for reference signals associated with a second RAT. The signal component 735 may be configured as or otherwise support a means for communicating the at least one control signal in accordance with the pattern.

Figure 8:
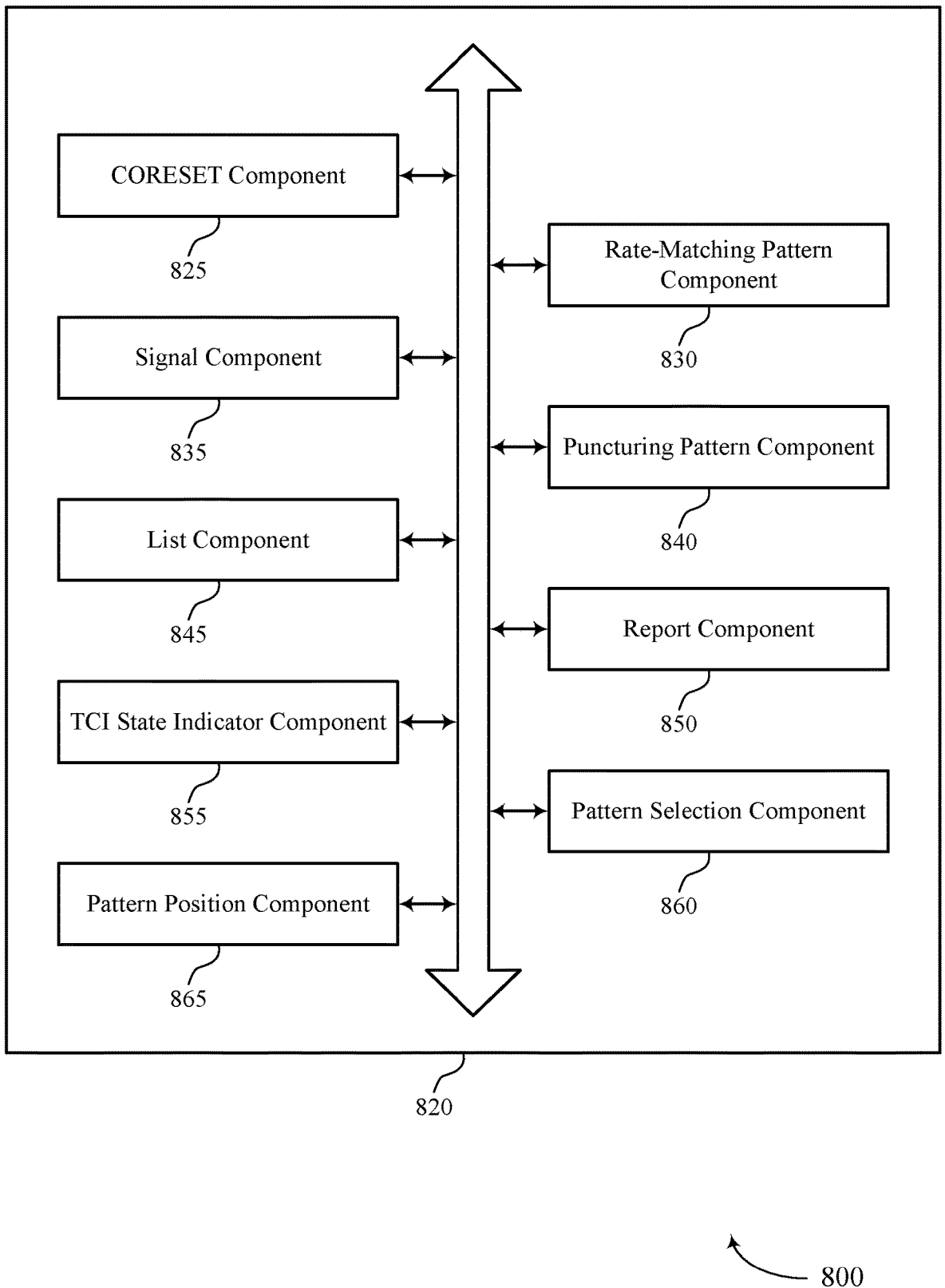
FIG. 8 shows a block diagram of a communications manager that supports patterns for control channel puncturing and shared channel rate-matching in accordance with one or more aspects of the present disclosure.

FIG. 8 shows a block diagram 800 of a communications manager 820 that supports patterns for control channel puncturing and shared channel rate-matching in accordance with one or more aspects of the present disclosure. The communications manager 820 may be an example of aspects of a communications manager 620, a communications manager 720, or both, as described herein. The communications manager 820, or various components thereof, may be an example of means for performing various aspects of patterns for control channel puncturing and shared channel rate-matching as described herein. For example, the communications manager 820 may include a CORESET component 825, a rate-matching pattern component 830, a signal component 835, a puncturing pattern component 840, a list component 845, a report component 850, a TCI state indicator component 855, a pattern selection component 860, a pattern position component 865, or any combination thereof. Each of these components may communicate, directly or indirectly, with one another (e.g., via one or more buses).

The communications manager 820 may support wireless communications at a UE (e.g., a UE 115) in accordance with examples as disclosed herein. The CORESET component 825 may be configured as or otherwise support a means for receiving a first message based on a CORESET associated with a TCI state, the first message scheduling at least one shared data signal associated with a first RAT. The rate-matching pattern component 830 may be configured as or otherwise support a means for receiving a second message indicating a pattern for rate-matching the at least one shared data signal around resources allocated for one or more reference signals associated with a second RAT. The signal component 835 may be configured as or otherwise support a means for communicating the at least one shared data signal in accordance with the pattern.

In some examples, the list component 845 may be configured as or otherwise support a means for receiving a third message indicating a first list including a first set of multiple patterns for rate-matching, where the pattern is based on two patterns selected from the first set of multiple patterns of the first list, and where the two patterns are overlapping in frequency. In some examples, the report component 850 may be configured as or otherwise support a means for transmitting a report indicating at least one UE capability associated with the rate-matching, where receiving the third message is based on the at least one UE capability.

In some examples, the list component 845 may be configured as or otherwise support a means for receiving a third message indicating a first list including a first set of multiple patterns for rate-matching and a second indication of a second list including a second set of multiple patterns for rate-matching, where the pattern is based on a first pattern selected from the first list and a second pattern selected from the second list, and where the first pattern and the second pattern are overlapping in frequency or non-overlapping in frequency. In some examples, the first pattern and the second pattern are associated with a pattern index. In some examples, the first pattern is selected from the first list and the second pattern is selected from the second list based on the pattern index.

In some examples, the list component 845 may be configured as or otherwise support a means for receiving a third message indicating a first list including a first set of multiple patterns for rate-matching and a second indication of a second list including a second set of multiple patterns for rate-matching, where the pattern is based on two patterns selected from the first list or the second list, and where the two patterns are overlapping in frequency.

In some examples, the TCI state indicator component 855 may be configured as or otherwise support a means for identifying an indicator associated with the TCI state, where the two patterns are selected from the first list based on the indicator including a first value and the two patterns are selected from the second list based on the indicator including a second value different from the first value.

In some examples, the pattern selection component 860 may be configured as or otherwise support a means for receiving a fourth message indicating for the UE to select the two patterns from one of the first list or the second list. In some examples, the pattern selection component 860 may be configured as or otherwise support a means for selecting the two patterns from one of the first list or the second list based on the fourth message. In some examples, the CORESET component 825 may be configured as or otherwise support a means for receiving a third message indicating the CORESET associated with the TCI state, where receiving the first message is based on the third message.

Additionally, or alternatively, the communications manager 820 may support wireless communication at a UE in accordance with examples as disclosed herein. In some examples, the CORESET component 825 may be configured as or otherwise support a means for receiving a first message indicating a CORESET associated with a first RAT. The puncturing pattern component 840 may be configured as or otherwise support a means for receiving a second message based on the CORESET, the second message indicating a pattern for puncturing at least one control signal associated with the first RAT around resources allocated in the CORE- SET for reference signals associated with a second RAT. In some examples, the signal component 835 may be configured as or otherwise support a means for communicating the at least one control signal in accordance with the pattern.

In some examples, the list component 845 may be configured as or otherwise support a means for receiving a third message indicating at least one list, where each list of the at least one list includes a set of multiple patterns for puncturing, and where the pattern is based on at least one pattern selected from the at least one list. In some examples, the pattern position component 865 may be configured as or otherwise support a means for receiving a fourth message indicating a pattern position, where the pattern is based on one pattern of the at least one pattern, and where the one pattern is selected from a list of the at least one list according to the pattern position.

In some examples, the pattern is based on each pattern of the at least one pattern. In some examples, each pattern of the at least one pattern is selected from a list of the at least one list. In some examples, the pattern is based on each pattern of the at least one pattern.

In some examples, the CORESET component 825 may be configured as or otherwise support a means for identifying an indicator associated with the CORESET, where the at least one pattern is selected from a list of the at least one list, and where the list is based on a value of the indicator. In some examples, the second message includes an RRC message. In some examples, the second message indicates the pattern via an IE.

In some examples, the report component 850 may be configured as or otherwise support a means for transmitting a report indicating at least one UE capability associated with puncturing control signals associated with the first RAT around the resources allocated in the CORESET for the reference signals associated with the second RAT, where receiving the second message is based on the at least one UE capability.

In some examples, the at least one UE capability includes a capability of the UE to support puncturing according to a number of patterns associated with a serving cell, a capability of the UE to support punctuating according to a number of patterns that overlap in frequency and are associated with a serving cell, a capability of the UE to support puncturing according to a number of patterns that non-overlapping in frequency and are associated with a serving cell, a capability of the UE to support puncturing for a number of CORESETs associated with a bandwidth part or a serving cell, or any combination thereof.

Figure 9:
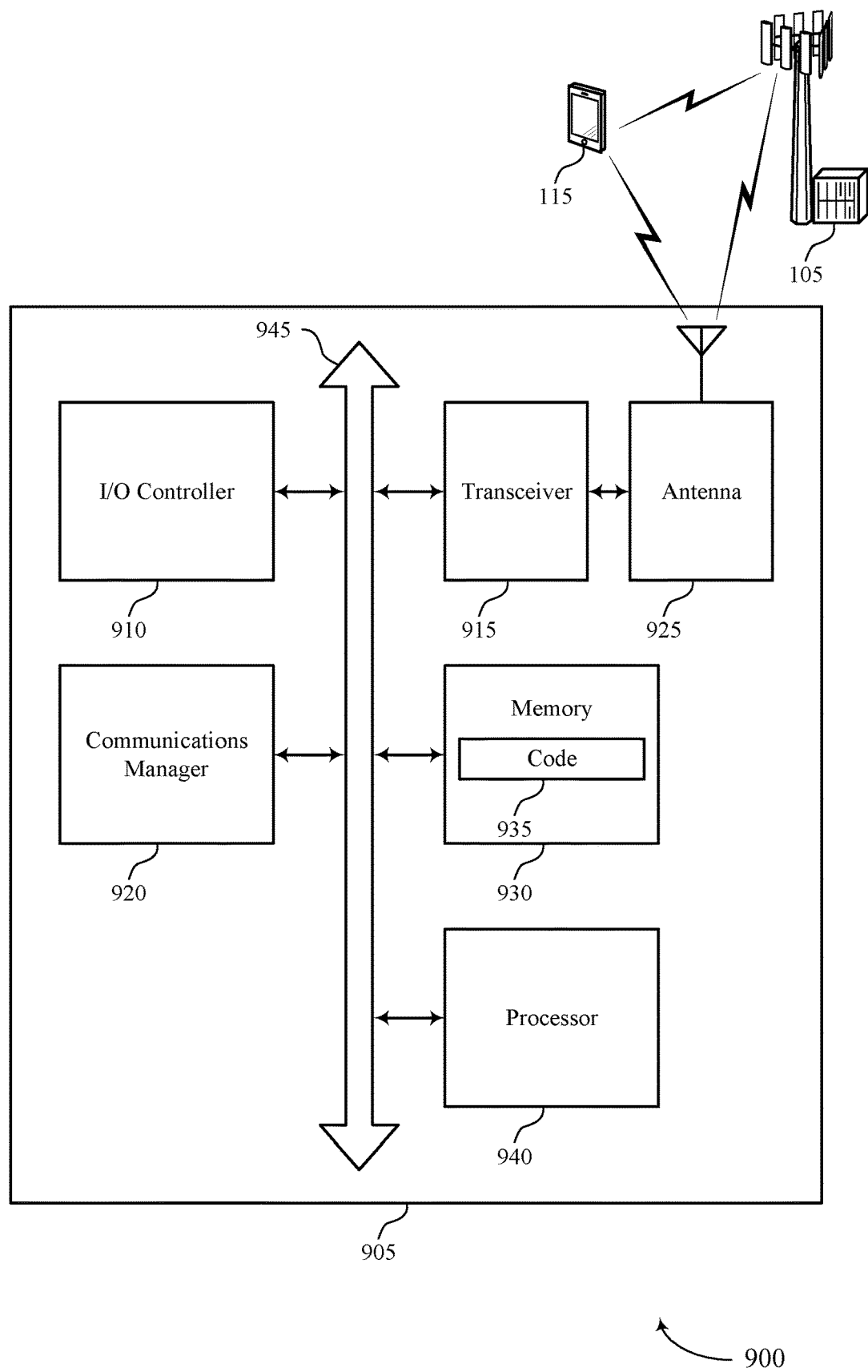
FIG. 9 shows a diagram of a system including a device that supports patterns for control channel puncturing and shared channel rate-matching in accordance with one or more aspects of the present disclosure.

FIG. 9 shows a diagram of a system 900 including a device 905 that supports patterns for control channel puncturing and shared channel rate-matching in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting patterns for control channel puncturing and shared channel rate-matching). For example, the device 905 or a component of the device 905 may include a processor 940 and memory 930 coupled with or to the processor 940, the processor 940 and memory 930 configured to perform various functions described herein.

The communications manager 920 may support wireless communications at a UE (e.g., the device 905) in accordance with examples as disclosed herein. For example, the communications manager 920 may be configured as or otherwise support a means for receiving a first message based on a CORESET associated with a TCI state, the first message scheduling at least one shared data signal associated with a first RAT. The communications manager 920 may be configured as or otherwise support a means for receiving a second message indicating a pattern for rate-matching the at least one shared data signal around resources allocated for one or more reference signals associated with a second RAT. The communications manager 920 may be configured as or otherwise support a means for communicating the at least one shared data signal in accordance with the pattern.

Additionally, or alternatively, the communications manager 920 may support wireless communication at a UE (e.g., the device 905) in accordance with examples as disclosed herein. For example, the communications manager 920 may be configured as or otherwise support a means for receiving a first message indicating a CORESET associated with a first RAT. The communications manager 920 may be configured as or otherwise support a means for receiving a second message based on the CORESET, the second message indicating a pattern for puncturing at least one control signal associated with the first RAT around resources allocated in the CORESET for reference signals associated with a second RAT. The communications manager 920 may be configured as or otherwise support a means for communicating the at least one control signal in accordance with the pattern.

By including or configuring the communications manager 920 in accordance with examples as described herein, the device 905 may support techniques for improved communication reliability, reduced latency, and more efficient utilization of communication resources, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of patterns for control channel puncturing and shared channel rate-matching as described herein, or the processor 940 and the memory 930 may be otherwise configured to perform or support such operations.

Figure 10:
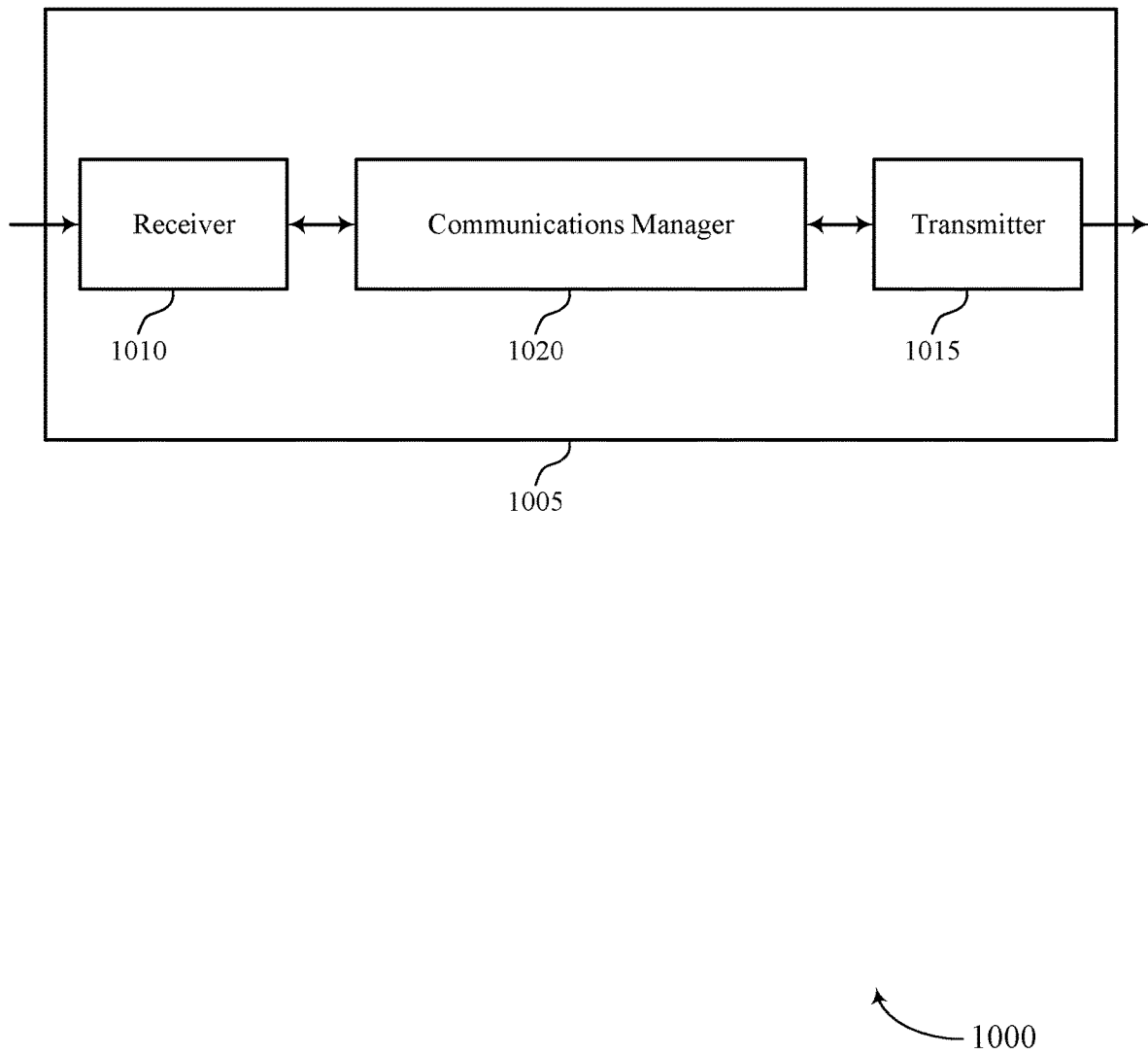
FIGS. 10 and 11 show block diagrams of devices that support patterns for control channel puncturing and shared channel rate-matching in accordance with one or more aspects of the present disclosure.

FIG. 10 shows a block diagram 1000 of a device 1005 that supports patterns for control channel puncturing and shared channel rate-matching in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of patterns for control channel puncturing and shared channel rate-matching as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity (e.g., the device 1005) in accordance with examples as disclosed herein. For example, the communications manager 1020 may be configured as or otherwise support a means for transmitting a first message based on a CORESET associated with a TCI state, the first message scheduling at least one shared data signal associated with a first RAT. The communications manager 1020 may be configured as or otherwise support a means for transmitting a second message indicating a pattern for rate-matching the at least one shared data signal around resources allocated for one or more reference signals associated with a second RAT. The communications manager 1020 may be configured as or otherwise support a means for communicating the at least one shared data signal in accordance with the pattern.

Additionally, or alternatively, the communications manager 1020 may support wireless communication at a network entity (e.g., device 1005) in accordance with examples as disclosed herein. For example, the communications manager 1020 may be configured as or otherwise support a means for transmitting a first message indicating a CORESET associated with a first RAT. The communications manager 1020 may be configured as or otherwise support a means for transmitting a second message based on the CORESET, the second message indicating a pattern for puncturing at least one control signal associated with the first RAT around resources allocated in the CORESET for reference signals associated with a second RAT. The communications manager 1020 may be configured as or otherwise support a means for communicating the at least one control signal in accordance with the pattern.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources, among other benefits.

Figure 11:
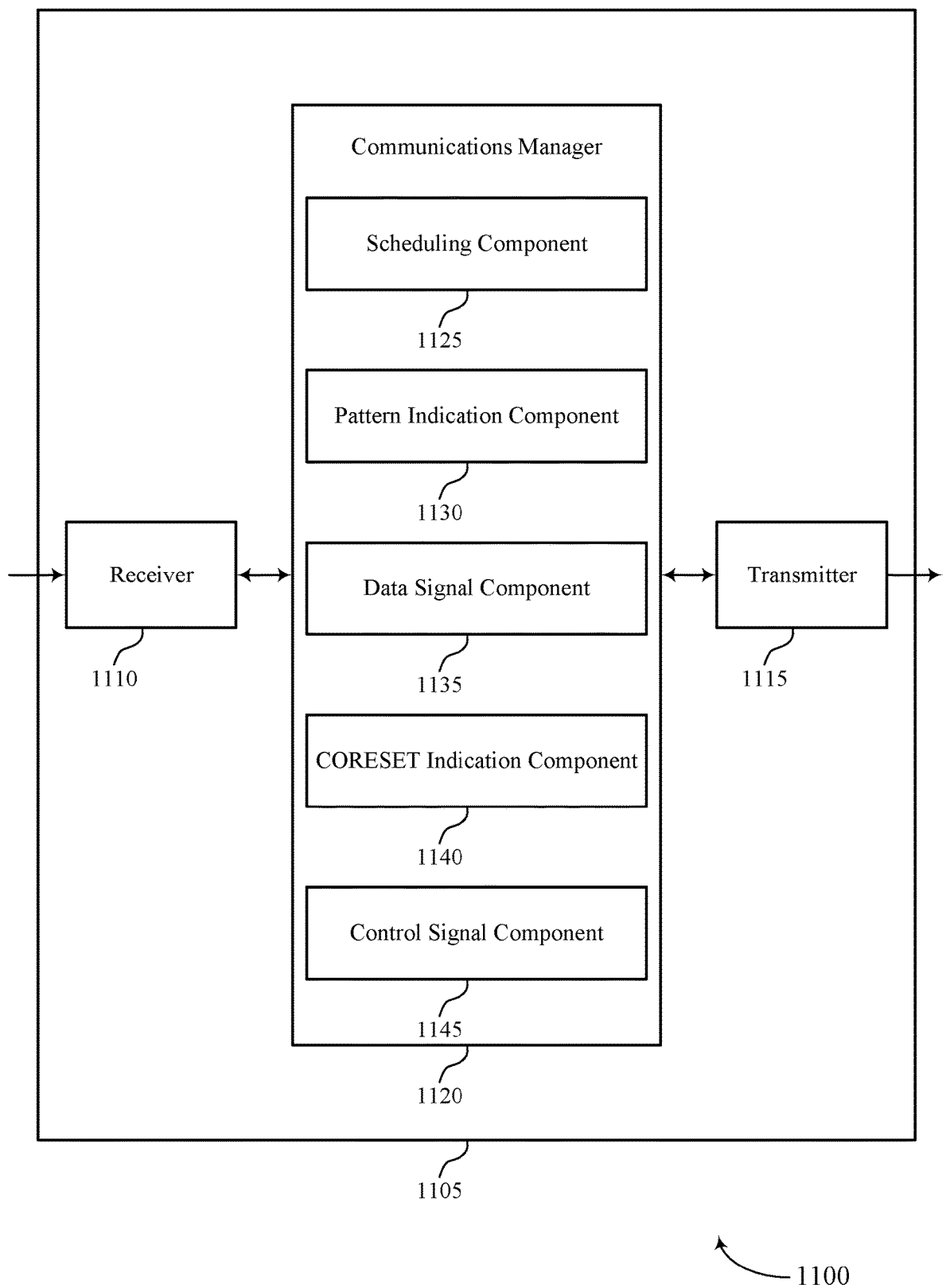

FIG. 11 shows a block diagram 1100 of a device 1105 that supports patterns for control channel puncturing and shared channel rate-matching in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of patterns for control channel puncturing and shared channel rate-matching as described herein. For example, the communications manager 1120 may include a scheduling component 1125, a pattern indication component 1130, a data signal component 1135, a CORESET indication component 1140, a control signal component 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity (e.g., device 1105) in accordance with examples as disclosed herein. The scheduling component 1125 may be configured as or otherwise support a means for transmitting a first message based on a CORESET associated with a TCI state, the first message scheduling at least one shared data signal associated with a first RAT. The pattern indication component 1130 may be configured as or otherwise support a means for transmitting a second message indicating a pattern for rate-matching the at least one shared data signal around resources allocated for one or more reference signals associated with a second RAT. The data signal component 1135 may be configured as or otherwise support a means for communicating the at least one shared data signal in accordance with the pattern.

Additionally, or alternatively, the communications manager 1120 may support wireless communication at a network entity (e.g., the device 1105) in accordance with examples as disclosed herein. The CORESET indication component 1140 may be configured as or otherwise support a means for transmitting a first message indicating a CORESET associated with a first RAT. The pattern indication component 1130 may be configured as or otherwise support a means for transmitting a second message based on the CORESET, the second message indicating a pattern for puncturing at least one control signal associated with the first RAT around resources allocated in the CORESET for reference signals associated with a second RAT. The control signal component 1145 may be configured as or otherwise support a means for communicating the at least one control signal in accordance with the pattern.

Figure 12:
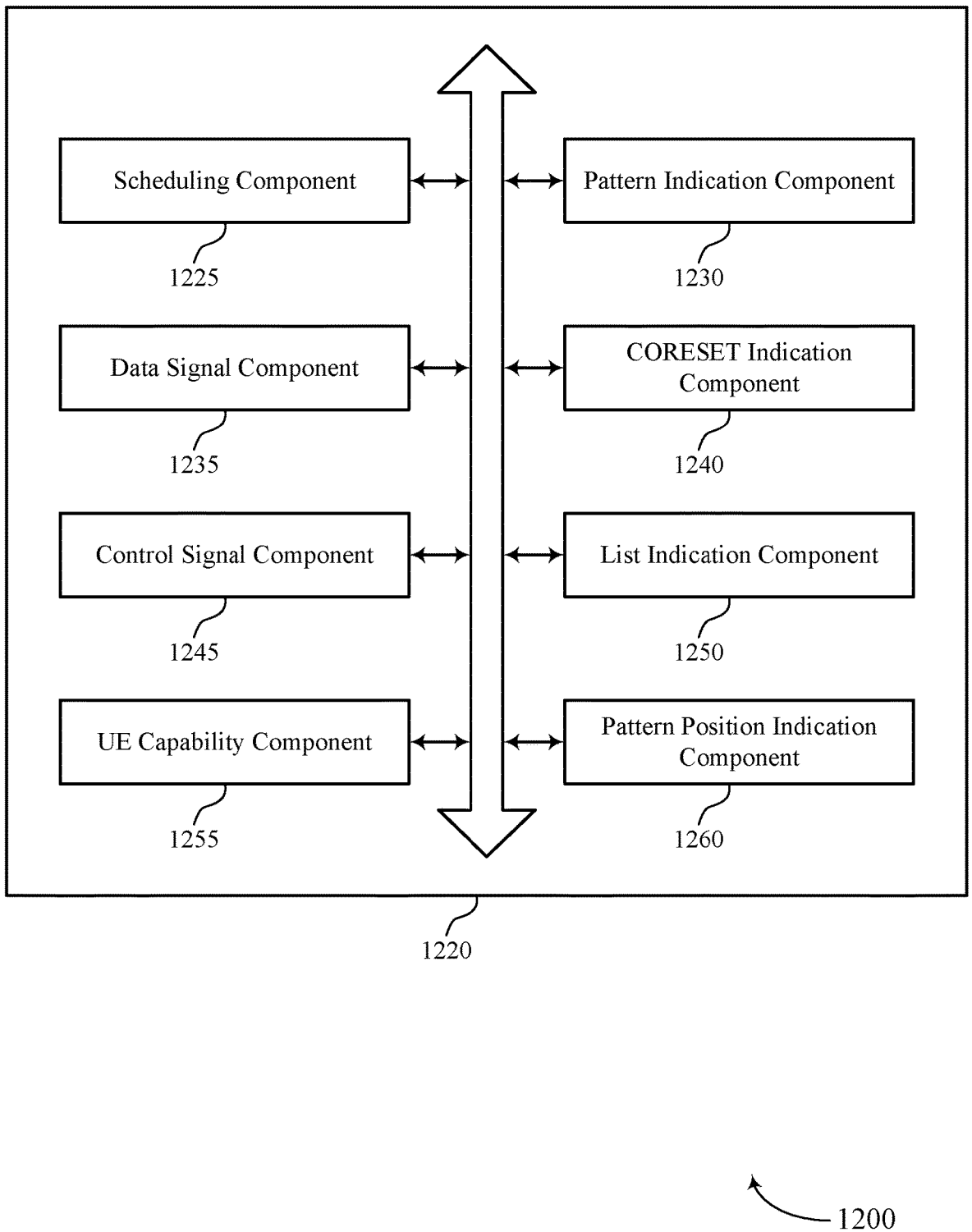
FIG. 12 shows a block diagram of a communications manager that supports patterns for control channel puncturing and shared channel rate-matching in accordance with one or more aspects of the present disclosure.

FIG. 12 shows a block diagram 1200 of a communications manager 1220 that supports patterns for control channel puncturing and shared channel rate-matching in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of patterns for control channel puncturing and shared channel rate-matching as described herein. For example, the communications manager 1220 may include a scheduling component 1225, a pattern indication component 1230, a data signal component 1235, a CORESET indication component 1240, a control signal component 1245, a list indication component 1250, a UE capability component 1255, a pattern position indication component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity (e.g., a network entity 105) in accordance with examples as disclosed herein. The scheduling component 1225 may be configured as or otherwise support a means for transmitting a first message based on a CORESET associated with a TCI state, the first message scheduling at least one shared data signal associated with a first RAT. The pattern indication component 1230 may be configured as or otherwise support a means for transmitting a second message indicating a pattern for rate-matching the at least one shared data signal around resources allocated for one or more reference signals associated with a second RAT. The data signal component 1235 may be configured as or otherwise support a means for communicating the at least one shared data signal in accordance with the pattern.

In some examples, the list indication component 1250 may be configured as or otherwise support a means for transmitting a third message indicating a first list including a first set of multiple patterns for rate-matching, where the pattern is based on two patterns selected from the first set of multiple patterns of the first list, and where the two patterns are overlapping in frequency or non-overlapping in frequency. In some examples, the UE capability component 1255 may be configured as or otherwise support a means for receiving a report indicating at least one UE capability associated with the rate-matching, where transmitting the third message is based on the at least one UE capability.

In some examples, the list indication component 1250 may be configured as or otherwise support a means for transmitting a third message indicating a first list including a first set of multiple patterns for rate-matching and a second indication of a second list including a second set of multiple patterns for rate-matching, where the pattern is based on a first pattern selected from the first list and a second pattern selected from the second list, and where the first pattern and the second pattern are overlapping in frequency. In some examples, the first pattern and the second pattern are associated with a pattern index. In some examples, the first pattern is selected from the first list and the second pattern is selected from the second list based on the pattern index.

In some examples, the list indication component 1250 may be configured as or otherwise support a means for transmitting a third message indicating a first list including a first set of multiple patterns for rate-matching and a second indication of a second list including a second set of multiple patterns for rate-matching, where the pattern is based on two patterns selected from one of the first list or the second list, and where the two patterns are overlapping in frequency.

In some examples, the two patterns are selected from the first list based on an indicator associated with the TCI state including a first value and the two patterns are selected from the second list based on the indicator associated with the TCI state including a second value different from the first value. In some examples, the pattern indication component 1230 may be configured as or otherwise support a means for transmitting a fourth message indicating for a UE to select the two patterns from one of the first list or the second list. In some examples, the CORESET indication component 1240 may be configured as or otherwise support a means for transmitting a third message indicating the CORESET associated with the TCI state, where receiving the first message is based on the third message.

Additionally, or alternatively, the communications manager 1220 may support wireless communication at a network entity in accordance with examples as disclosed herein. The CORESET indication component 1240 may be configured as or otherwise support a means for transmitting a first message indicating a CORESET associated with a first RAT. In some examples, the pattern indication component 1230 may be configured as or otherwise support a means for transmitting a second message based on the CORESET, the second message indicating a pattern for puncturing at least one control signal associated with the first RAT around resources allocated in the CORESET for reference signals associated with a second RAT. The control signal component 1245 may be configured as or otherwise support a means for communicating the at least one control signal in accordance with the pattern.

In some examples, the list indication component 1250 may be configured as or otherwise support a means for transmitting a third message indicating at least one list, where each list of the at least one list includes a set of multiple patterns for puncturing, and where the pattern is based on at least one pattern selected from the at least one list. In some examples, the pattern position indication component 1260 may be configured as or otherwise support a means for transmitting a fourth message indicating a pattern position, where the pattern is based on one pattern of the at least one pattern, and where the one pattern is selected from a list of the at least one list according to the pattern position.

In some examples, the pattern is based on each pattern of the at least one pattern. In some examples, each pattern of the at least one pattern is selected from a list of the at least one list. In some examples, the pattern is based on each pattern of the at least one pattern. In some examples, the at least one pattern is selected from a list of the at least one list. In some examples, the list is based on a value of an indicator associated with the CORESET. In some examples, the second message includes an RRC message. In some examples, the second message indicates the pattern via an IE.

In some examples, the UE capability component 1255 may be configured as or otherwise support a means for receiving a report indicating at least one UE capability associated with puncturing control signals associated with the first RAT around the resources allocated in the CORESET for the reference signals associated with the second RAT, where transmitting the second message is based on the at least one UE capability.

In some examples, the at least one UE capability includes a capability of a UE to support puncturing according to a number of patterns associated with a serving cell, a capability of a UE to support punctuating according to a number of patterns that overlap in frequency and are associated with a serving cell, a capability of a UE to support puncturing according to a number of patterns that non-overlapping in frequency and are associated with a serving cell, a capability of a UE to support puncturing for a number of CORESETs associated with a bandwidth part or a serving cell, or any combination thereof.

Figure 13:
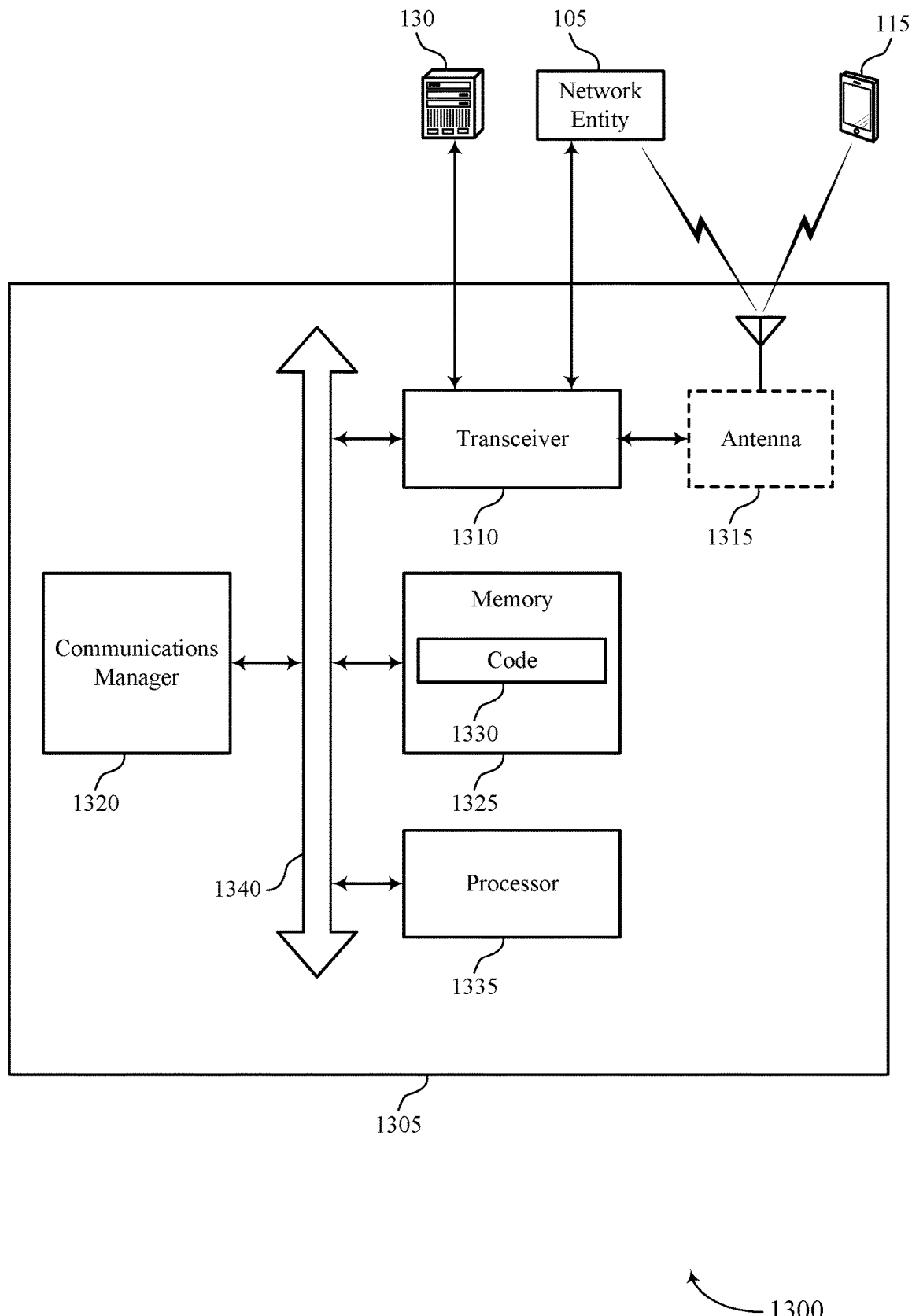
FIG. 13 shows a diagram of a system including a device that supports patterns for control channel puncturing and shared channel rate-matching in accordance with one or more aspects of the present disclosure.

FIG. 13 shows a diagram of a system 1300 including a device 1305 that supports patterns for control channel puncturing and shared channel rate-matching in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting patterns for control channel puncturing and shared channel rate-matching). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity (e.g., the device 1305) in accordance with examples as disclosed herein. For example, the communications manager 1320 may be configured as or otherwise support a means for transmitting a first message based on a CORESET associated with a TCI state, the first message scheduling at least one shared data signal associated with a first RAT. The communications manager 1320 may be configured as or otherwise support a means for transmitting a second message indicating a pattern for rate-matching the at least one shared data signal around resources allocated for one or more reference signals associated with a second RAT. The communications manager 1320 may be configured as or otherwise support a means for communicating the at least one shared data signal in accordance with the pattern.

Additionally, or alternatively, the communications manager 1320 may support wireless communication at a network entity in accordance with examples as disclosed herein. For example, the communications manager 1320 may be configured as or otherwise support a means for transmitting a first message indicating a CORESET associated with a first RAT. The communications manager 1320 may be configured as or otherwise support a means for transmitting a second message based on the CORESET, the second message indicating a pattern for puncturing at least one control signal associated with the first RAT around resources allocated in the CORESET for reference signals associated with a second RAT. The communications manager 1320 may be configured as or otherwise support a means for communicating the at least one control signal in accordance with the pattern.

By including or configuring the communications manager 1320 in accordance with examples as described herein, the device 1305 may support techniques for improved communication reliability, reduced latency, and more efficient utilization of communication resources, among other benefits.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of patterns for control channel puncturing and shared channel rate-matching as described herein, or the processor 1335 and the memory 1325 may be otherwise configured to perform or support such operations.

Figure 14:
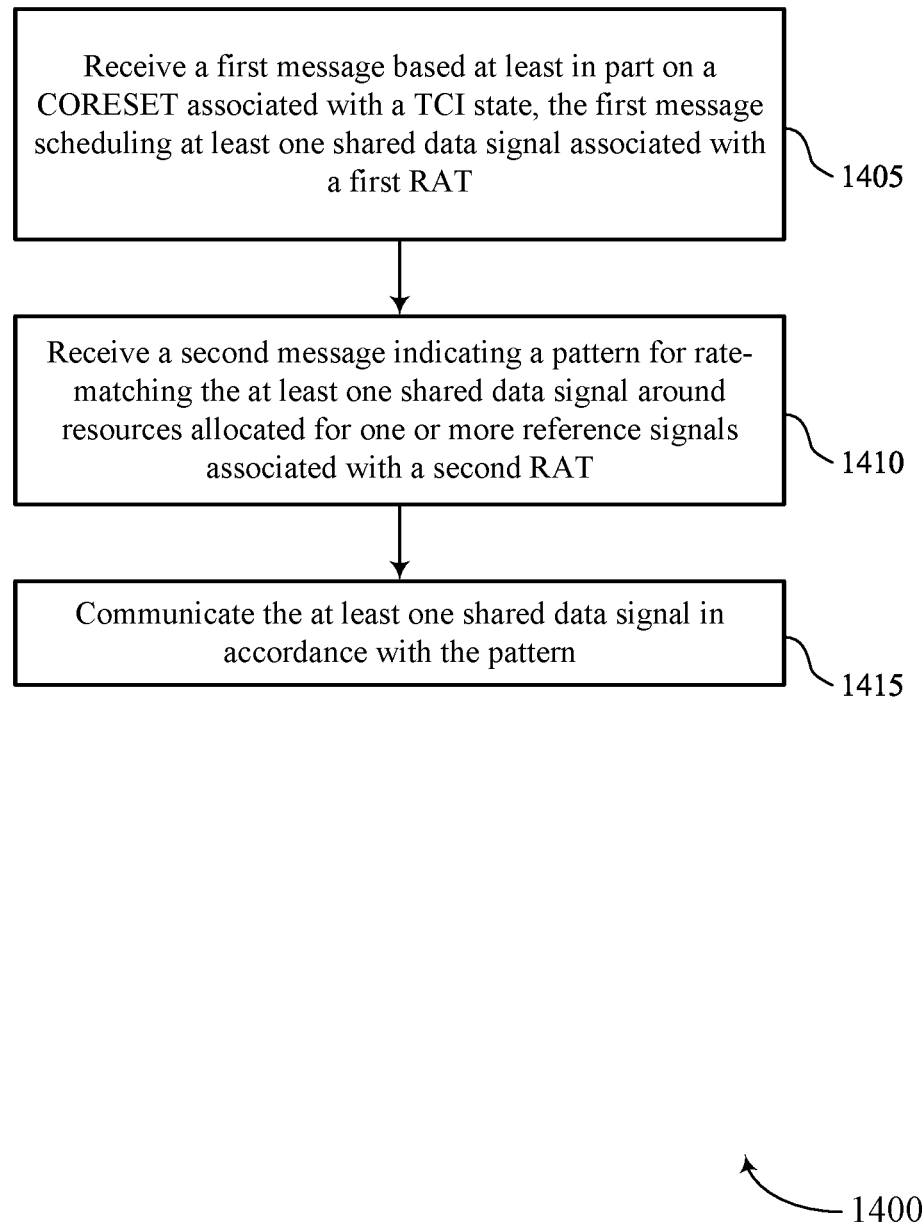
FIGS. 14 through 21 show flowcharts illustrating methods that support patterns for control channel puncturing and shared channel rate-matching in accordance with one or more aspects of the present disclosure.

FIG. 14 shows a flowchart illustrating a method 1400 that supports patterns for control channel puncturing and shared channel rate-matching in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first message based on a CORESET associated with a TCI state, the first message scheduling at least one shared data signal associated with a first RAT. The operations of 1405 may be performed in accordance with examples as disclosed herein. In some examples, aspects of the operations of 1405 may be performed by a CORESET component 825 as described with reference to FIG. 8.

At 1410, the method may include receiving a second message indicating a pattern for rate-matching the at least one shared data signal around resources allocated for one or more reference signals associated with a second RAT. The operations of 1410 may be performed in accordance with examples as disclosed herein. In some examples, aspects of the operations of 1410 may be performed by a rate-matching pattern component 830 as described with reference to FIG. 8.

At 1415, the method may include communicating the at least one shared data signal in accordance with the pattern. The operations of 1415 may be performed in accordance with examples as disclosed herein. In some examples, aspects of the operations of 1415 may be performed by a signal component 835 as described with reference to FIG. 8.

Figure 15:
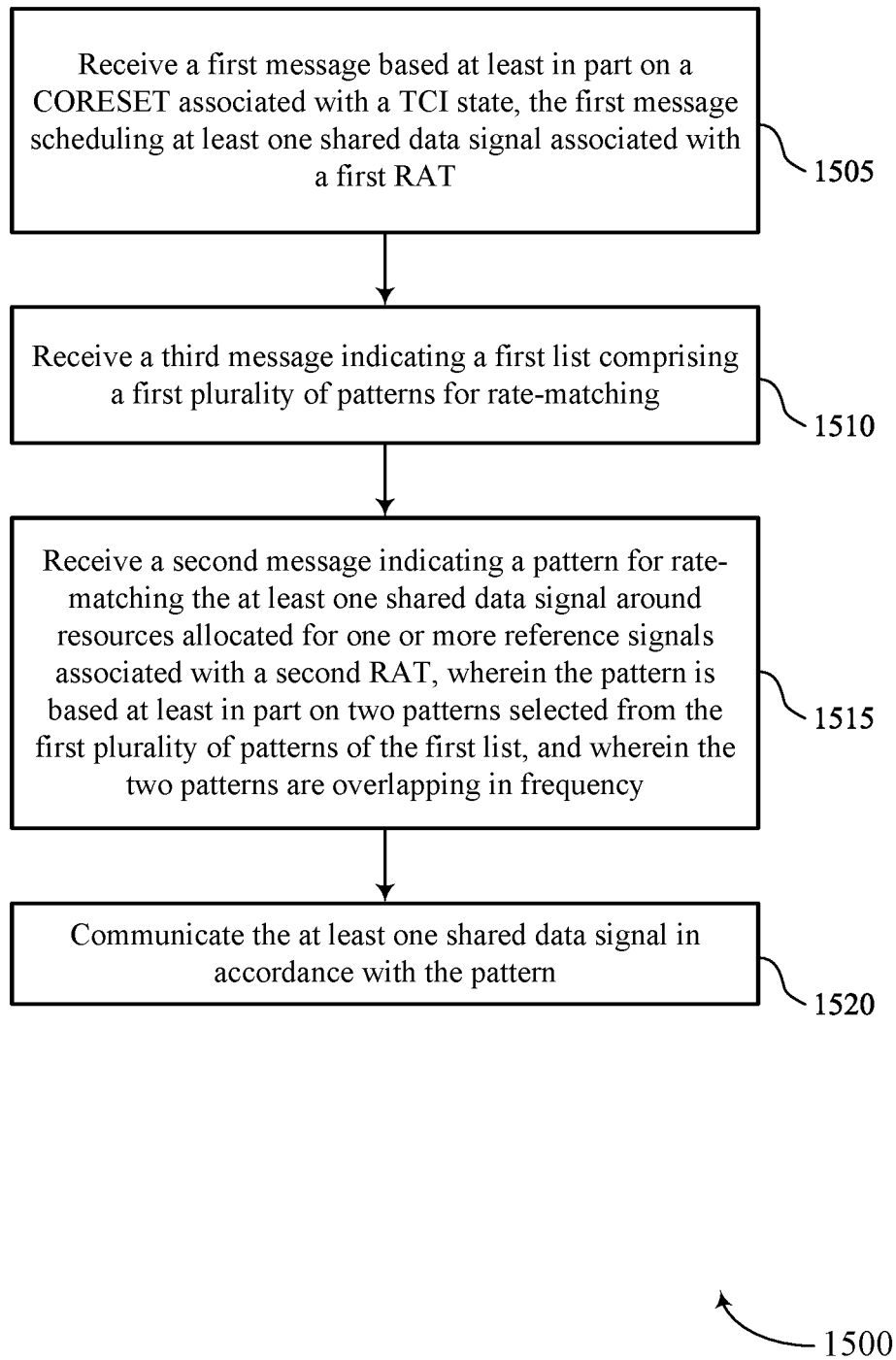

FIG. 15 shows a flowchart illustrating a method 1500 that supports patterns for control channel puncturing and shared channel rate-matching in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first message based on a CORESET associated with a TCI state, the first message scheduling at least one shared data signal associated with a first RAT. The operations of 1505 may be performed in accordance with examples as disclosed herein. In some examples, aspects of the operations of 1505 may be performed by a CORESET component 825 as described with reference to FIG. 8.

At 1510, the method may include receiving a third message indicating a first list including a first set of multiple patterns for rate-matching. The operations of 1510 may be performed in accordance with examples as disclosed herein. In some examples, aspects of the operations of 1510 may be performed by a list component 845 as described with reference to FIG. 8.

At 1515, the method may include receiving a second message indicating a pattern for rate-matching the at least one shared data signal around resources allocated for one or more reference signals associated with a second RAT, where the pattern is based on two patterns selected from the first set of multiple patterns of the first list, and where the two patterns are overlapping in frequency. The operations of 1515 may be performed in accordance with examples as disclosed herein. In some examples, aspects of the operations of 1515 may be performed by a rate-matching pattern component 830 as described with reference to FIG. 8.

At 1520, the method may include communicating the at least one shared data signal in accordance with the pattern. The operations of 1520 may be performed in accordance with examples as disclosed herein. In some examples, aspects of the operations of 1520 may be performed by a signal component 835 as described with reference to FIG. 8.

Figure 16:
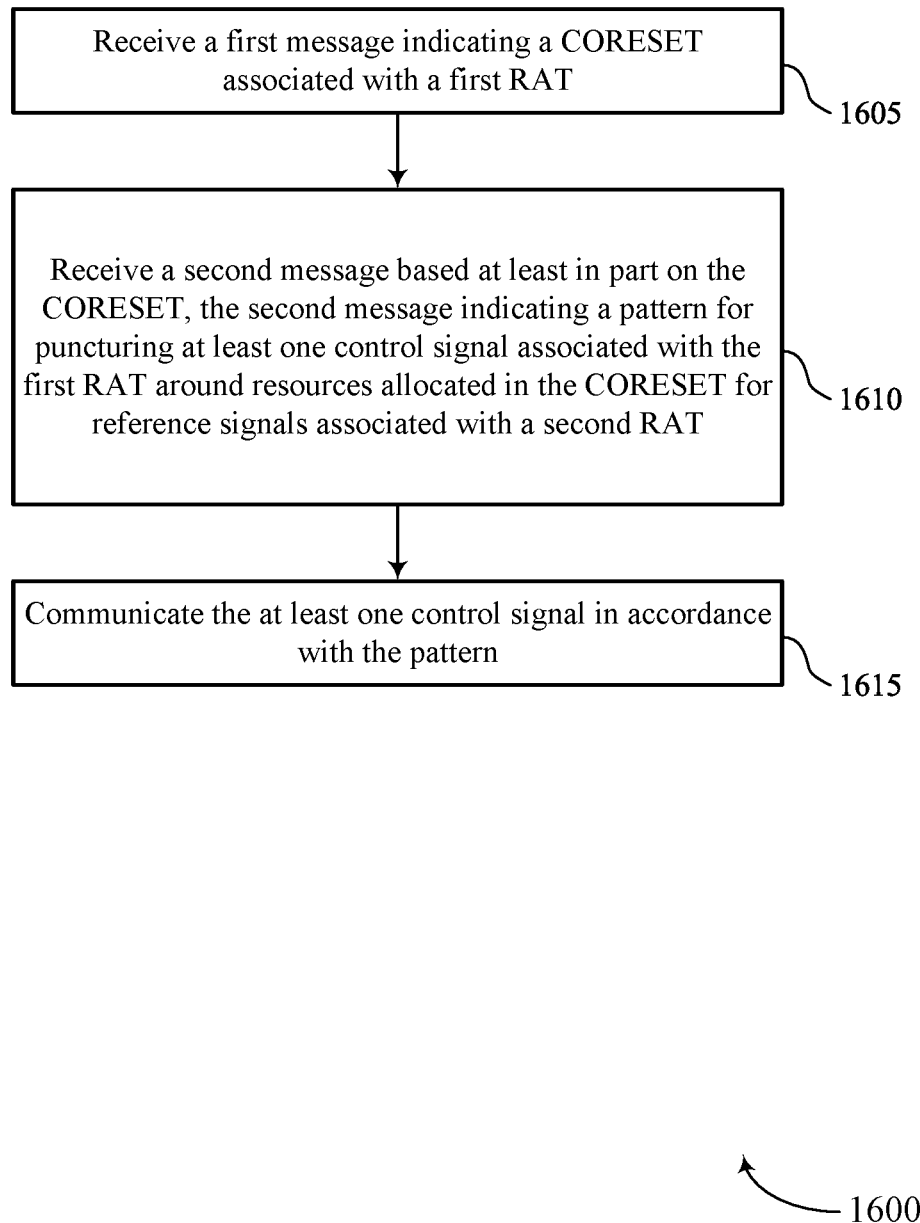

FIG. 16 shows a flowchart illustrating a method 1600 that supports patterns for control channel puncturing and shared channel rate-matching in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating a CORESET associated with a first RAT. The operations of 1605 may be performed in accordance with examples as disclosed herein. In some examples, aspects of the operations of 1605 may be performed by a CORESET component 825 as described with reference to FIG. 8.

At 1610, the method may include receiving a second message based on the CORESET, the second message indicating a pattern for puncturing at least one control signal associated with the first RAT around resources allocated in the CORESET for reference signals associated with a second RAT. The operations of 1610 may be performed in accordance with examples as disclosed herein. In some examples, aspects of the operations of 1610 may be performed by a puncturing pattern component 840 as described with reference to FIG. 8.

At 1615, the method may include communicating the at least one control signal in accordance with the pattern. The operations of 1615 may be performed in accordance with examples as disclosed herein. In some examples, aspects of the operations of 1615 may be performed by a signal component 835 as described with reference to FIG. 8.

Figure 17:
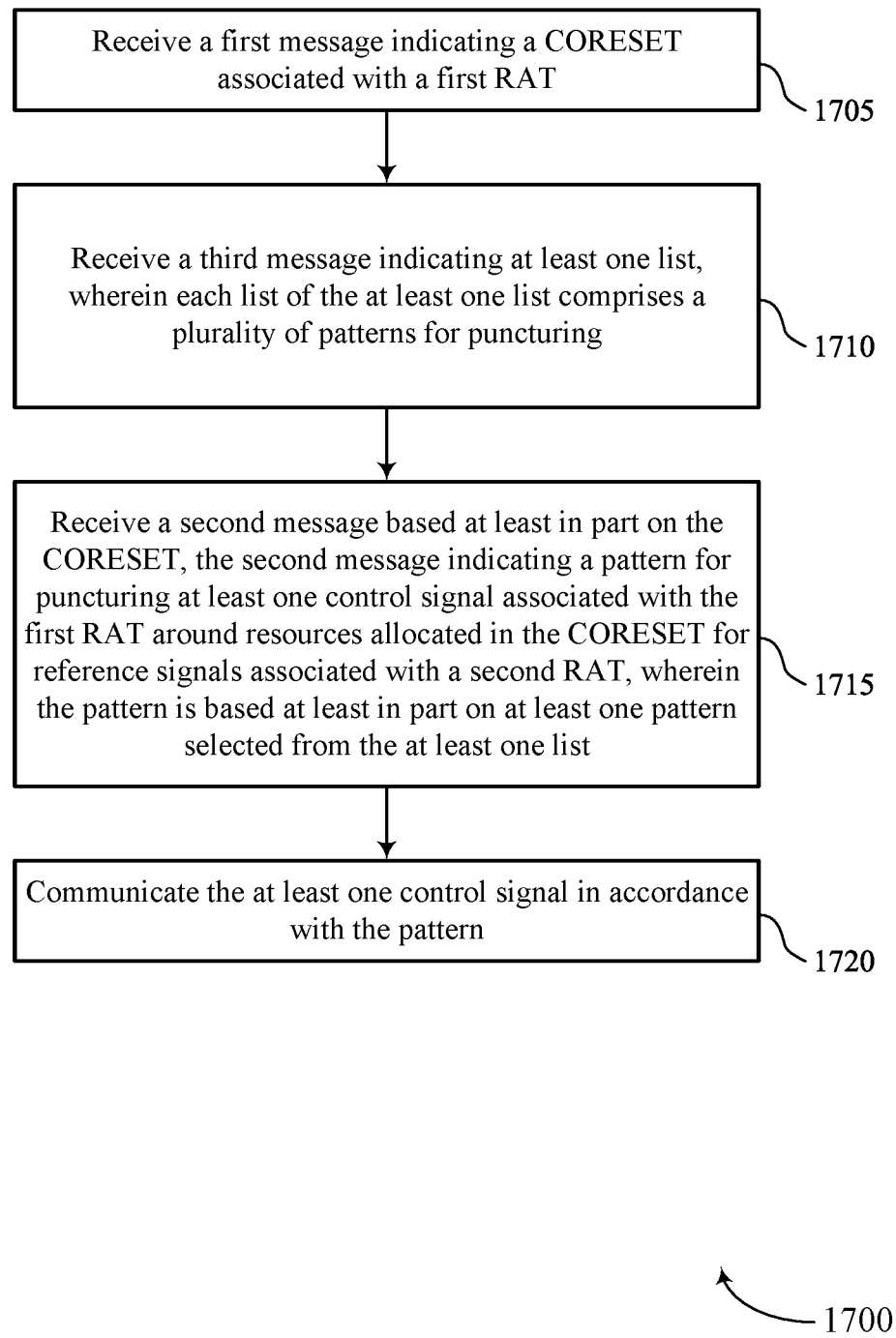

FIG. 17 shows a flowchart illustrating a method 1700 that supports patterns for control channel puncturing and shared channel rate-matching in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a first message indicating a CORESET associated with a first RAT. The operations of 1705 may be performed in accordance with examples as disclosed herein. In some examples, aspects of the operations of 1705 may be performed by a CORESET component 825 as described with reference to FIG. 8.

At 1710, the method may include receiving a third message indicating at least one list, where each list of the at least one list includes a set of multiple patterns for puncturing. The operations of 1710 may be performed in accordance with examples as disclosed herein. In some examples, aspects of the operations of 1710 may be performed by a list component 845 as described with reference to FIG. 8.

At 1715, the method may include receiving a second message based on the CORESET, the second message indicating a pattern for puncturing at least one control signal associated with the first RAT around resources allocated in the CORESET for reference signals associated with a second RAT, where the pattern is based on at least one pattern selected from the at least one list. The operations of 1715 may be performed in accordance with examples as disclosed herein. In some examples, aspects of the operations of 1715 may be performed by a puncturing pattern component 840 as described with reference to FIG. 8.

At 1720, the method may include communicating the at least one control signal in accordance with the pattern. The operations of 1720 may be performed in accordance with examples as disclosed herein. In some examples, aspects of the operations of 1720 may be performed by a signal component 835 as described with reference to FIG. 8.

Figure 18:
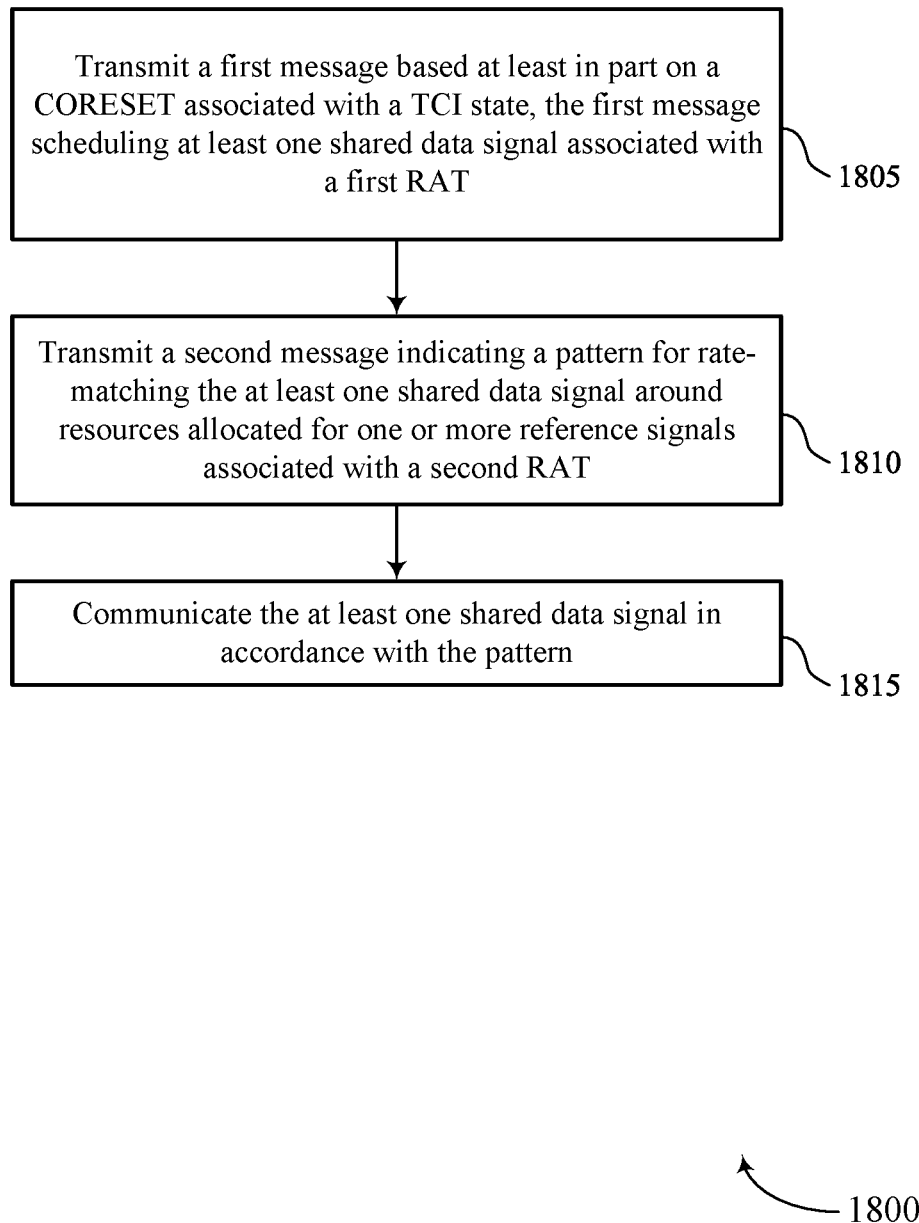

FIG. 18 shows a flowchart illustrating a method 1800 that supports patterns for control channel puncturing and shared channel rate-matching in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first message based on a CORESET associated with a TCI state, the first message scheduling at least one shared data signal associated with a first RAT. The operations of 1805 may be performed in accordance with examples as disclosed herein. In some examples, aspects of the operations of 1805 may be performed by a scheduling component 1225 as described with reference to FIG. 12.

At 1810, the method may include transmitting a second message indicating a pattern for rate-matching the at least one shared data signal around resources allocated for one or more reference signals associated with a second RAT. The operations of 1810 may be performed in accordance with examples as disclosed herein. In some examples, aspects of the operations of 1810 may be performed by a pattern indication component 1230 as described with reference to FIG. 12.

At 1815, the method may include communicating the at least one shared data signal in accordance with the pattern. The operations of 1815 may be performed in accordance with examples as disclosed herein. In some examples, aspects of the operations of 1815 may be performed by a data signal component 1235 as described with reference to FIG. 12.

Figure 19:
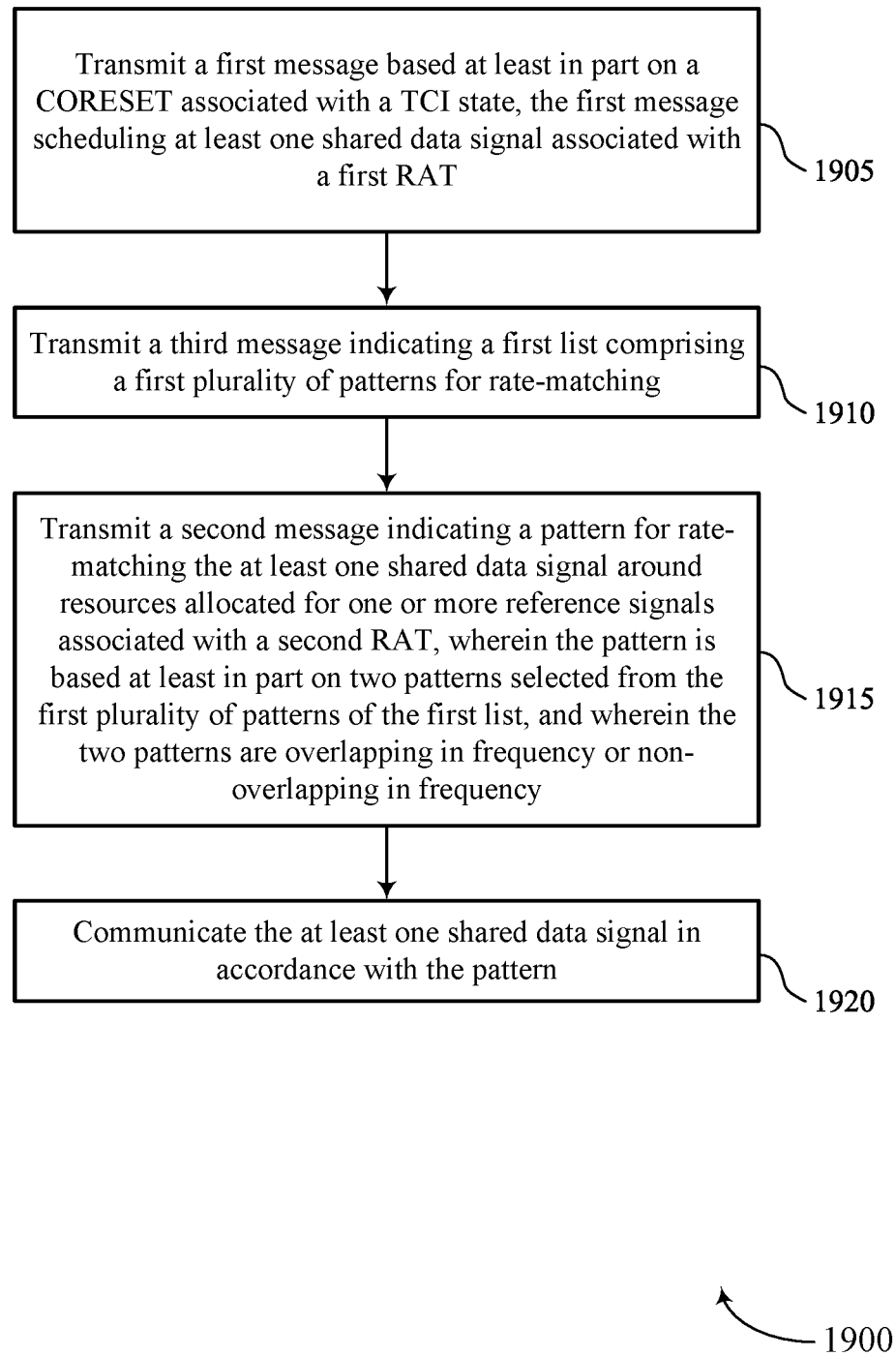

FIG. 19 shows a flowchart illustrating a method 1900 that supports patterns for control channel puncturing and shared channel rate-matching in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a first message based on a CORESET associated with a TCI state, the first message scheduling at least one shared data signal associated with a first RAT. The operations of 1905 may be performed in accordance with examples as disclosed herein. In some examples, aspects of the operations of 1905 may be performed by a scheduling component 1225 as described with reference to FIG. 12.

At 1910, the method may include transmitting a third message indicating a first list including a first set of multiple patterns for rate-matching. The operations of 1910 may be performed in accordance with examples as disclosed herein.

In some examples, aspects of the operations of 1910 may be performed by a list indication component 1250 as described with reference to FIG. 12.

At 1915, the method may include transmitting a second message indicating a pattern for rate-matching the at least one shared data signal around resources allocated for one or more reference signals associated with a second RAT, where the pattern is based on two patterns selected from the first set of multiple patterns of the first list, and where the two patterns are overlapping in frequency or non-overlapping in frequency. The operations of 1915 may be performed in accordance with examples as disclosed herein. In some examples, aspects of the operations of 1915 may be performed by a pattern indication component 1230 as described with reference to FIG. 12.

At 1920, the method may include communicating the at least one shared data signal in accordance with the pattern. The operations of 1920 may be performed in accordance with examples as disclosed herein. In some examples, aspects of the operations of 1920 may be performed by a data signal component 1235 as described with reference to FIG. 12.

Figure 20:
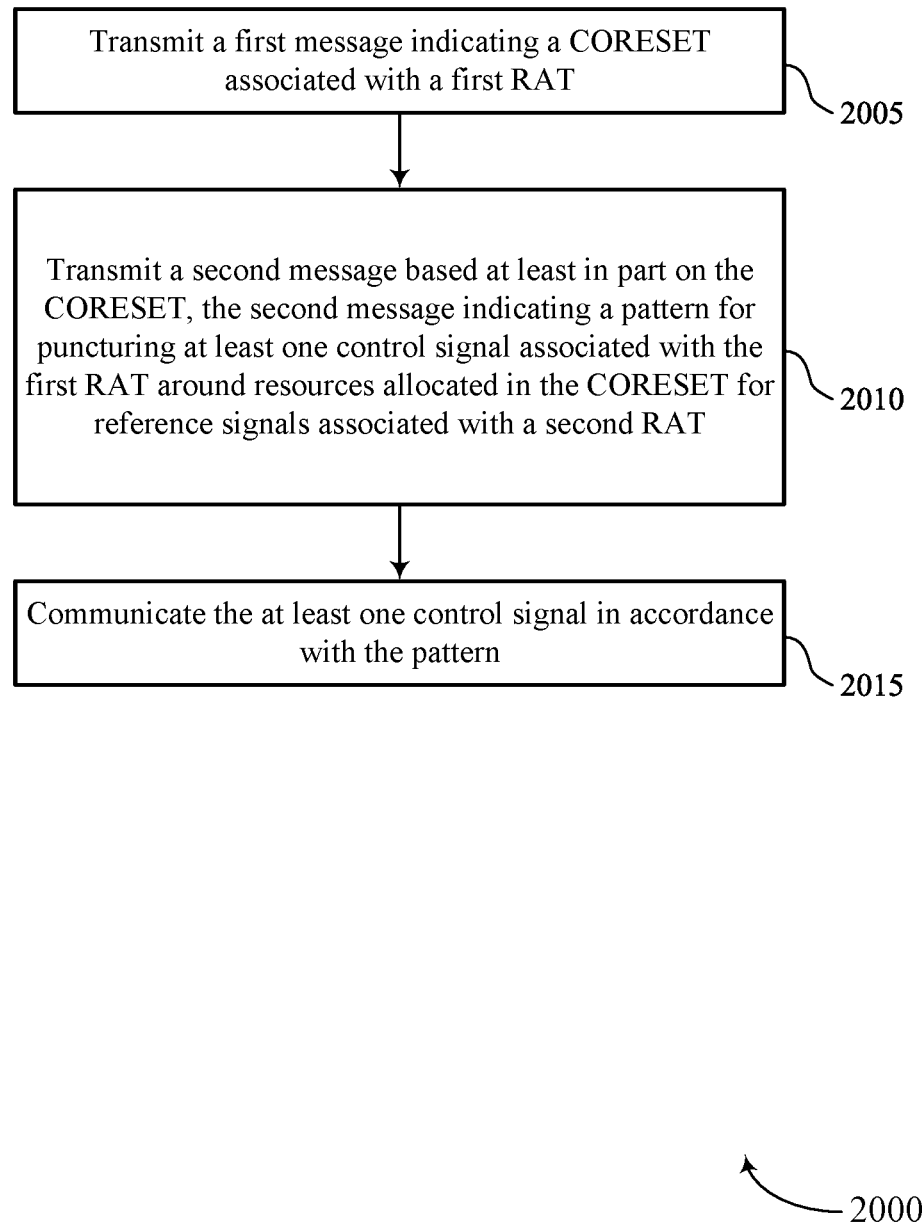

FIG. 20 shows a flowchart illustrating a method 2000 that supports patterns for control channel puncturing and shared channel rate-matching in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a first message indicating a CORESET associated with a first RAT. The operations of 2005 may be performed in accordance with examples as disclosed herein. In some examples, aspects of the operations of 2005 may be performed by a CORESET indication component 1240 as described with reference to FIG. 12.

At 2010, the method may include transmitting a second message based on the CORESET, the second message indicating a pattern for puncturing at least one control signal associated with the first RAT around resources allocated in the CORESET for reference signals associated with a second RAT. The operations of 2010 may be performed in accordance with examples as disclosed herein. In some examples, aspects of the operations of 2010 may be performed by a pattern indication component 1230 as described with reference to FIG. 12.

At 2015, the method may include communicating the at least one control signal in accordance with the pattern. The operations of 2015 may be performed in accordance with examples as disclosed herein. In some examples, aspects of the operations of 2015 may be performed by a control signal component 1245 as described with reference to FIG. 12.

Figure 21:
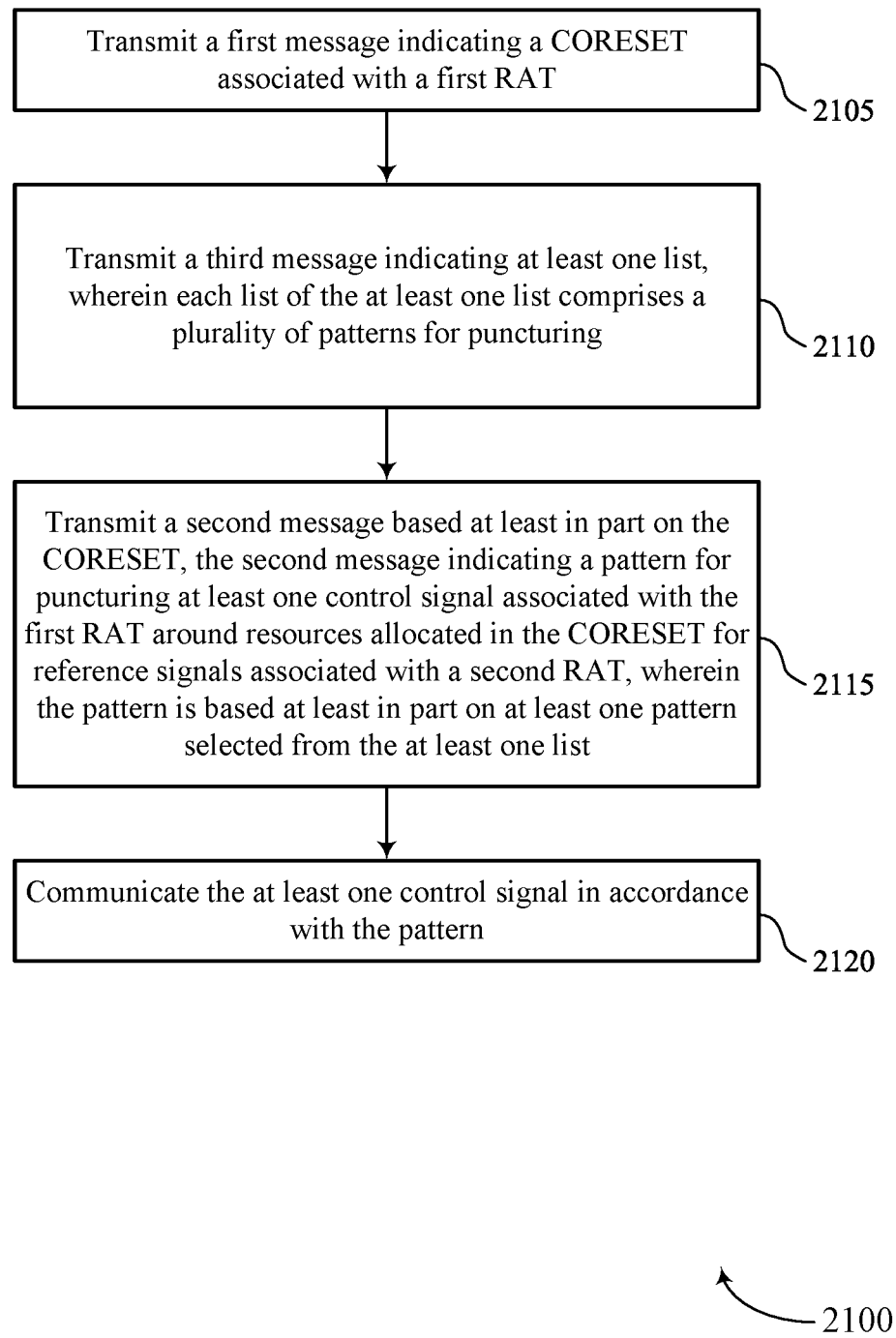

FIG. 21 shows a flowchart illustrating a method 2100 that supports patterns for control channel puncturing and shared channel rate-matching in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting a first message indicating a CORESET associated with a first RAT. The operations of 2105 may be performed in accordance with examples as disclosed herein. In some examples, aspects of the operations of 2105 may be performed by a CORESET indication component 1240 as described with reference to FIG. 12.

At 2110, the method may include transmitting a third message indicating at least one list, where each list of the at least one list includes a set of multiple patterns for puncturing. The operations of 2110 may be performed in accordance with examples as disclosed herein. In some examples, aspects of the operations of 2110 may be performed by a list indication component 1250 as described with reference to FIG. 12.

At 2115, the method may include transmitting a second message based on the CORESET, the second message indicating a pattern for puncturing at least one control signal associated with the first RAT around resources allocated in the CORESET for reference signals associated with a second RAT, where the pattern is based on at least one pattern selected from the at least one list. The operations of 2115 may be performed in accordance with examples as disclosed herein. In some examples, aspects of the operations of 2115 may be performed by a pattern indication component 1230 as described with reference to FIG. 12.

At 2120, the method may include communicating the at least one control signal in accordance with the pattern. The operations of 2120 may be performed in accordance with examples as disclosed herein. In some examples, aspects of the operations of 2120 may be performed by a control signal component 1245 as described with reference to FIG. 12.

The following provides an overview of aspects of the present disclosure:

Aspect 1: A method for wireless communications at a UE, comprising: receiving a first message based at least in part on a CORESET associated with a TCI state, the first message scheduling at least one shared data signal associated with a first RAT; receiving a second message indicating a pattern for rate-matching the at least one shared data signal around resources allocated for one or more reference signals associated with a second RAT; and communicating the at least one shared data signal in accordance with the pattern.

Aspect 2: The method of aspect 1, further comprising: receiving a third message indicating a first list comprising a first plurality of patterns for rate-matching, wherein the pattern is based at least in part on two patterns selected from the first plurality of patterns of the first list, and wherein the two patterns are overlapping in frequency.

Aspect 3: The method of aspect 2, further comprising: transmitting a report indicating at least one UE capability associated with the rate-matching, wherein receiving the third message is based at least in part on the at least one UE capability.

Aspect 4: The method of aspect 1, further comprising: receiving a third message indicating a first list comprising a first plurality of patterns for rate-matching and a second indication of a second list including a second plurality of patterns for rate-matching, wherein the pattern is based at least in part on a first pattern selected from the first list and a second pattern selected from the second list, and wherein the first pattern and the second pattern are overlapping in frequency or non-overlapping in frequency.

Aspect 5: The method of aspect 4, wherein the first pattern and the second pattern are associated with a pattern index, and the first pattern is selected from the first list and the second pattern is selected from the second list based at least in part on the pattern index.

Aspect 6: The method of aspect 1, further comprising: receiving a third message indicating a first list comprising a first plurality of patterns for rate-matching and a second indication of a second list including a second plurality of patterns for rate-matching, wherein the pattern is based at least in part on two patterns selected from the first list or the second list, and wherein the two patterns are overlapping in frequency.

Aspect 7: The method of aspect 6, further comprising: identifying an indicator associated with the TCI state, wherein the two patterns are selected from the first list based at least in part on the indicator comprising a first value and the two patterns are selected from the second list based at least in part on the indicator comprising a second value different from the first value.

Aspect 8: The method of aspect 6, further comprising: receiving a fourth message indicating for the UE to select the two patterns from one of the first list or the second list; and selecting the two patterns from one of the first list or the second list based at least in part on the fourth message.

Aspect 9: The method of any of aspects 1 through 8, further comprising: receiving a third message indicating the CORESET associated with the TCI state, wherein receiving the first message is based at least in part on the third message.

Aspect 10: A method for wireless communication at a UE, comprising: receiving a first message indicating a CORESET associated with a first RAT; receiving a second message based at least in part on the CORESET, the second message indicating a pattern for puncturing at least one control signal associated with the first RAT around resources allocated in the CORESET for reference signals associated with a second RAT; and communicating the at least one control signal in accordance with the pattern.

Aspect 11: The method of aspect 10, further comprising: receiving a third message indicating at least one list, wherein each list of the at least one list comprises a plurality of patterns for puncturing, and wherein the pattern is based at least in part on at least one pattern selected from the at least one list.

Aspect 12: The method of aspect 11, further comprising: receiving a fourth message indicating a pattern position, wherein the pattern is based at least in part on one pattern of the at least one pattern, and wherein the one pattern is selected from a list of the at least one list according to the pattern position.

Aspect 13: The method of aspect 11, wherein the pattern is based at least in part on each pattern of the at least one pattern, and each pattern of the at least one pattern is selected from a list of the at least one list.

Aspect 14: The method of aspect 11, wherein the pattern is based at least in part on each pattern of the at least one pattern.

Aspect 15: The method of aspect 11, further comprising: identifying an indicator associated with the CORESET, wherein the at least one pattern is selected from a list of the at least one list, and wherein the list is based at least in part on a value of the indicator.

Aspect 16: The method of any of aspects 10 through 15, wherein the second message comprises an RRC message, and the second message indicates the pattern via an information element.

Aspect 17: The method of any of aspects 10 through 16, further comprising: transmitting a report indicating at least one UE capability associated with puncturing control signals associated with the first RAT around the resources allocated in the CORESET for the reference signals associated with the second RAT, wherein receiving the second message is based at least in part on the at least one UE capability.

Aspect 18: The method of aspect 17, wherein the at least one UE capability comprises a capability of the UE to support puncturing according to a number of patterns associated with a serving cell, a capability of the UE to support punctuating according to a number of patterns that overlap in frequency and are associated with a serving cell, a capability of the UE to support puncturing according to a number of patterns that non-overlapping in frequency and are associated with a serving cell, a capability of the UE to support puncturing for a number of CORESETs associated with a bandwidth part or a serving cell, or any combination thereof.

Aspect 19: A method for wireless communications at a network entity, comprising: transmitting a first message based at least in part on a CORESET associated with a TCI state, the first message scheduling at least one shared data signal associated with a first RAT; transmitting a second message indicating a pattern for rate-matching the at least one shared data signal around resources allocated for one or more reference signals associated with a second RAT; and communicating the at least one shared data signal in accordance with the pattern.

Aspect 20: The method of aspect 19, further comprising: transmitting a third message indicating a first list comprising a first plurality of patterns for rate-matching, wherein the pattern is based at least in part on two patterns selected from the first plurality of patterns of the first list, and wherein the two patterns are overlapping in frequency or non-overlapping in frequency.

Aspect 21: The method of aspect 20, further comprising: receiving a report indicating at least one UE capability associated with the rate-matching, wherein transmitting the third message is based at least in part on the at least one UE capability.

Aspect 22: The method of aspect 19, further comprising: transmitting a third message indicating a first list comprising a first plurality of patterns for rate-matching and a second indication of a second list including a second plurality of patterns for rate-matching, wherein the pattern is based at least in part on a first pattern selected from the first list and a second pattern selected from the second list, and wherein the first pattern and the second pattern are overlapping in frequency.

Aspect 23: The method of aspect 22, wherein the first pattern and the second pattern are associated with a pattern index, and the first pattern is selected from the first list and the second pattern is selected from the second list based at least in part on the pattern index.

Aspect 24: The method of aspect 19, further comprising: transmitting a third message indicating a first list comprising a first plurality of patterns for rate-matching and a second indication of a second list including a second plurality of patterns for rate-matching, wherein the pattern is based at least in part on two patterns selected from one of the first list or the second list, and wherein the two patterns are overlapping in frequency.

Aspect 25: The method of aspect 24, wherein the two patterns are selected from the first list based at least in part on an indicator associated with the TCI state comprising a first value and the two patterns are selected from the second list based at least in part on the indicator associated with the TCI state comprising a second value different from the first value.

Aspect 26: The method of aspect 24, further comprising: transmitting a fourth message indicating for a UE to select the two patterns from one of the first list or the second list.

Aspect 27: The method of any of aspects 19 through 26, further comprising: transmitting a third message indicating the CORESET associated with the TCI state, wherein receiving the first message is based at least in part on the third message.

Aspect 28: A method for wireless communication at a network entity, comprising: transmitting a first message indicating a CORESET associated with a first RAT; transmitting a second message based at least in part on the CORESET, the second message indicating a pattern for puncturing at least one control signal associated with the first RAT around resources allocated in the CORESET for reference signals associated with a second RAT; and communicating the at least one control signal in accordance with the pattern.

Aspect 29: The method of aspect 28, further comprising: transmitting a third message indicating at least one list, wherein each list of the at least one list comprises a plurality of patterns for puncturing, and wherein the pattern is based at least in part on at least one pattern selected from the at least one list.

Aspect 30: The method of aspect 29, further comprising: transmitting a fourth message indicating a pattern position, wherein the pattern is based at least in part on one pattern of the at least one pattern, and wherein the one pattern is selected from a list of the at least one list according to the pattern position.

Aspect 31: The method of aspect 29, wherein the pattern is based at least in part on each pattern of the at least one pattern, and each pattern of the at least one pattern is selected from a list of the at least one list.

Aspect 32: The method of aspect 29, wherein the pattern is based at least in part on each pattern of the at least one pattern.

Aspect 33: The method of aspect 29, wherein the at least one pattern is selected from a list of the at least one list, and the list is based at least in part on a value of an indicator associated with the CORESET.

Aspect 34: The method of any of aspects 28 through 33, wherein the second message comprises an RRC message, and the second message indicates the pattern via an information element.

Aspect 35: The method of any of aspects 28 through 34, further comprising: receiving a report indicating at least one UE capability associated with puncturing control signals associated with the first RAT around the resources allocated in the CORESET for the reference signals associated with the second RAT, wherein transmitting the second message is based at least in part on the at least one UE capability.

Aspect 36: The method of aspect 35, wherein the at least one UE capability comprises a capability of a UE to support puncturing according to a number of patterns associated with a serving cell, a capability of a UE to support puncturing according to a number of patterns that overlap in frequency and are associated with a serving cell, a capability of a UE to support puncturing according to a number of patterns that non-overlapping in frequency and are associated with a serving cell, a capability of a UE to support puncturing for a number of CORESETs associated with a bandwidth part or a serving cell, or any combination thereof.

Aspect 37: An apparatus for wireless communications at a UE, comprising a memory, and a processor coupled with the memory and configured to cause the apparatus to perform a method of any of aspects 1 through 9.

Aspect 38: An apparatus for wireless communications at a UE, comprising at least one means for performing a method of any of aspects 1 through 9.

Aspect 39: A non-transitory computer-readable medium storing code for wireless communications at a UE, the code comprising instructions executable by a processor to perform a method of any of aspects 1 through 9.

Aspect 40: An apparatus for wireless communication at a UE, comprising a memory, and a processor coupled with the memory and configured to cause the apparatus to perform a method of any of aspects 10 through 18.

Aspect 41: An apparatus for wireless communication at a UE, comprising at least one means for performing a method of any of aspects 10 through 18.

Aspect 42: A non-transitory computer-readable medium storing code for wireless communication at a UE, the code comprising instructions executable by a processor to perform a method of any of aspects 10 through 18.

Aspect 43: An apparatus for wireless communications at a network entity, comprising a memory, and a processor coupled with the memory and configured to cause the apparatus to perform a method of any of aspects 19 through 27.

Aspect 44: An apparatus for wireless communications at a network entity, comprising at least one means for performing a method of any of aspects 19 through 27.

Aspect 45: A non-transitory computer-readable medium storing code for wireless communications at a network entity, the code comprising instructions executable by a processor to perform a method of any of aspects 19 through 27.

Aspect 46: An apparatus for wireless communication at a network entity, comprising a memory, and a processor coupled with the memory and configured to cause the apparatus to perform a method of any of aspects 28 through 36.

Aspect 47: An apparatus for wireless communication at a network entity, comprising at least one means for performing a method of any of aspects 28 through 36.

Aspect 48: A non-transitory computer-readable medium storing code for wireless communication at a network entity, the code comprising instructions executable by a processor to perform a method of any of aspects 28 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more memories; and
   one or more processors coupled with the one or more memories and configured to:
   receive a first message indicating a control resource set associated with a transmission configuration indicator state, wherein at least one shared data signal associated with a first radio access technology is scheduled by a control signal that is based at least in part on the control resource set;

receive a second message indicating a pattern for rate-matching the at least one shared data signal around resources allocated for one or more reference signals associated with a second radio access technology, wherein the pattern is selected from a first list comprising a first plurality of patterns for rate-matching, a second list comprising a second plurality of patterns for rate-matching, or both based at least in part on an indicator associated with the transmission configuration indicator state, wherein the pattern is selected from the first list based at least in part on the indicator comprising a first value, and wherein the pattern is selected from the second list based at least in part on the indicator comprising a second value different from the first value; and communicate the at least one shared data signal in accordance with the pattern.

2. The apparatus of claim 1, wherein the one or more processors are further configured to:

transmit a report indicating at least one UE capability associated with the rate-matching, wherein receiving the second message is based at least in part on the at least one UE capability.

3. The apparatus of claim 1, wherein the one or more processors are further configured to:

receive a third message indicating the first list comprising the first plurality of patterns for rate-matching and a second indication of the second list including the second plurality of patterns for rate-matching, wherein the pattern is based at least in part on a first pattern selected from the first list and a second pattern selected from the second list, and wherein the first pattern and the second pattern are overlapping in frequency or non-overlapping in frequency.

4. The apparatus of claim 3, wherein:

the first pattern and the second pattern are associated with a pattern index, and the first pattern is selected from the first list and the second pattern is selected from the second list based at least in part on the pattern index.

5. The apparatus of claim 1, wherein the one or more processors are further configured to:

receive a third message indicating the first list comprising the first plurality of patterns for rate-matching and a second indication of the second list comprising the second plurality of patterns for rate-matching, wherein the pattern is based at least in part on two patterns selected from the first list or the second list, and wherein the two patterns are overlapping in frequency.

6. The apparatus of claim 1, wherein the one or more processors are further configured to:

receive a fourth message indicating for the UE to select the pattern from one of the first list or the second list; and select the pattern from one of the first list or the second list based at least in part on the fourth message.

7. The apparatus of claim 1, wherein the one or more processors are further configured to:

receive a third message indicating the control resource set associated with the transmission configuration indicator state, wherein receiving the first message is based at least in part on the third message.

8. The apparatus of claim 1, wherein the pattern is selected from both the first list and the second list based at least in part on the indicator not being configured.

9. An apparatus for wireless communication at a user equipment (UE), comprising:

one or more memories; and one or more processors coupled with the one or more memories and configured to:

transmit a report indicating a capability of the UE to puncture control signals associated with a first radio access technology around resources allocated for reference signals associated with a second radio access technology;

receive a first message indicating a control resource set associated with the first radio access technology;

receive a second message based at least in part on the capability of the UE, the second message indicating a pattern for puncturing at least one control signal associated with the first radio access technology around the resources allocated for the reference signals associated with the second radio access technology; and communicate the at least one control signal and the reference signals in accordance with the pattern.

10. The apparatus of claim 9, wherein the one or more processors are further configured to:

receive a third message indicating at least one list, wherein each list of the at least one list comprises a plurality of patterns for puncturing, and wherein the pattern is based at least in part on at least one pattern selected from the at least one list.

11. The apparatus of claim 10, wherein the one or more processors are further configured to:

receive a fourth message indicating a pattern position, wherein the pattern is based at least in part on one pattern of the at least one pattern, and wherein the one pattern is selected from a list of the at least one list according to the pattern position.

12. The apparatus of claim 10, wherein:

the pattern is based at least in part on each pattern of the at least one pattern, and each pattern of the at least one pattern is selected from a list of the at least one list.

13. The apparatus of claim 10, wherein the pattern is based at least in part on each pattern of the at least one pattern.

14. The apparatus of claim 10, wherein the one or more processors are further configured to:

identify an indicator associated with the control resource set, wherein the at least one pattern is selected from a list of the at least one list, and wherein the list is based at least in part on a value of the indicator.

15. The apparatus of claim 9, wherein:

the second message comprises a radio resource control message, and the second message indicates the pattern via an information element.

16. The apparatus of claim 9, wherein the capability of the UE comprises a capability of the UE to support puncturing according to a number of patterns associated with a serving cell, a capability of the UE to support punctuating according to a number of patterns that overlap in frequency and are associated with a serving cell, a capability of the UE to support puncturing according to a number of patterns that non-overlapping in frequency and are associated with a serving cell, a capability of the UE to support puncturing for a number of control resource sets associated with a bandwidth part or a serving cell, or any combination thereof.

17. An apparatus for wireless communications at a network entity, comprising:

one or more memories; and one or more processors coupled with the one or more memories and configured to:
- transmit a first message indicating a control resource set associated with a transmission configuration indicator state, wherein at least one shared data signal associated with a first radio access technology is scheduled by a control signal that is based at least in part on the control resource set;
- transmit a second message indicating a pattern for rate-matching the at least one shared data signal around resources allocated for one or more reference signals associated with a second radio access technology, wherein the pattern is selected from a first list comprising a first plurality of patterns for rate-matching, a second list comprising a second plurality of patterns for rate-matching, or both based at least in part on an indicator associated with the transmission configuration indicator state, wherein the pattern is selected from the first list based at least in part on the indicator comprising a first value, and wherein the pattern is selected from the second list based at least in part on the indicator comprising a second value different from the first value; and
- communicate the at least one shared data signal in accordance with the pattern.

18. The apparatus of claim 17, wherein the one or more processors are further configured to:
receive a report indicating at least one user equipment (UE) capability associated with the rate-matching, wherein transmitting the second message is based at least in part on the at least one UE capability.

19. The apparatus of claim 17, wherein the one or more processors are further configured to:
transmit a third message indicating the first list comprising the first plurality of patterns for rate-matching and a second indication of the second list comprising the second plurality of patterns for rate-matching, wherein the pattern is based at least in part on a first pattern selected from the first list and a second pattern selected from the second list, and wherein the first pattern and the second pattern are overlapping in frequency.

20. The apparatus of claim 17, wherein the one or more processors are further configured to:
transmit a third message indicating the first list comprising the first plurality of patterns for rate-matching and a second indication of the second list comprising the second plurality of patterns for rate-matching, wherein the pattern is based at least in part on two patterns selected from one of the first list or the second list, and wherein the two patterns are overlapping in frequency.

21. The apparatus of claim 20, wherein the one or more processors are further configured to:
transmit a fourth message indicating for a UE to select the two patterns from one of the first list or the second list.

22. The apparatus of claim 17, wherein the one or more processors are further configured to:
transmit a third message indicating the control resource set associated with the transmission configuration indicator state, wherein receiving the first message is based at least in part on the third message.

23. The apparatus of claim 17, wherein the pattern is selected from both the first list and the second list based at least in part on the indicator not being configured.

24. An apparatus for wireless communication at a network entity, comprising:
one or more memories; and
one or more processors coupled with the one or more memories and configured to:
- receive a report indicating a capability of a user equipment (UE) to puncture control signals associated with a first radio access technology around resources allocated for reference signals associated with a second radio access technology;
- transmit a first message indicating a control resource set associated with the first radio access technology;
- transmit a second message based at least in part on the capability of the UE, the second message indicating a pattern for puncturing at least one control signal associated with the first radio access technology around the resources allocated for the reference signals associated with the second radio access technology; and
- communicate the at least one control signal and the reference signals in accordance with the pattern.

25. The apparatus of claim 24, wherein the one or more processors are further configured to:
transmit a third message indicating at least one list, wherein each list of the at least one list comprises a plurality of patterns for puncturing, and wherein the pattern is based at least in part on at least one pattern selected from the at least one list.

26. The apparatus of claim 25, wherein the one or more processors are further configured to:
transmit a fourth message indicating a pattern position, wherein the pattern is based at least in part on one pattern of the at least one pattern, and wherein the one pattern is selected from a list of the at least one list according to the pattern position.

27. The apparatus of claim 24, wherein:
the second message comprises a radio resource control message, and
the second message indicates the pattern via an information element.

28. A method for wireless communications at a user equipment (UE), comprising:
receiving a first message indicating a control resource set associated with a transmission configuration indicator state, wherein at least one shared data signal associated with a first radio access technology is scheduled by a control signal that is based at least in part on the control resource set;
receiving a second message indicating a pattern for rate-matching the at least one shared data signal around resources allocated for one or more reference signals associated with a second radio access technology, wherein the pattern is selected from a first list comprising a first plurality of patterns for rate-matching, a second list comprising a second plurality of patterns for rate-matching, or both based at least in part on an indicator associated with the transmission configuration indicator state, wherein the pattern is selected from the first list based at least in part on the indicator comprising a first value, and wherein the pattern is selected from the second list based at least in part on the indicator comprising a second value different from the first value; and
communicating the at least one shared data signal in accordance with the pattern.

* * * * *